US012755566B2

(12) United States Patent
Ferraro et al.

(10) Patent No.: US 12,755,566 B2
(45) Date of Patent: Oct. 6, 2026

(54) COMPUTER-IMPLEMENTED METHOD AND CORRESPONDING APPARATUS FOR IDENTIFYING SUBCELLULAR STRUCTURES IN THE NON-CHEMICAL STAINING MODE FROM PHASE CONTRAST TOMOGRAPHY RECONSTRUCTIONS IN FLOW CYTOMETRY

(71) Applicant: CONSIGLIO NAZIONALE DELLE RICERCHE, Rome (IT)

(72) Inventors: Pietro Ferraro, Naples (IT); Daniele Pirone, Baronissi (IT); Pasquale Memmolo, Regalbuto (IT); Lisa Miccio, Piano di Sorrento (IT); Vittorio Bianco, Naples (IT); Demetri Psaltis, Preverenges (CH); Joowon Lim, Renens (CH)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 324 days.

(21) Appl. No.: 18/580,676

(22) PCT Filed: Jul. 19, 2022

(86) PCT No.: PCT/IB2022/056625
§ 371 (c)(1),
(2) Date: Jan. 19, 2024

(87) PCT Pub. No.: WO2023/002355
PCT Pub. Date: Jan. 26, 2023

(65) Prior Publication Data

US 2024/0378908 A1 Nov. 14, 2024

(30) Foreign Application Priority Data

Jul. 22, 2021 (IT) ........................ 102021000019490

(51) Int. Cl.
*G16H 30/40* (2018.01)
*G01N 15/01* (2024.01)
(Continued)

(52) U.S. Cl.
CPC ........... *G06V 20/695* (2022.01); *G01N 15/01* (2024.01); *G01N 15/1429* (2013.01);
(Continued)

(58) Field of Classification Search
CPC .... G06V 20/695; G06V 10/25; G06V 10/273; G06V 10/34; G06V 10/443;
(Continued)

(56) References Cited

U.S. PATENT DOCUMENTS

2017/0333903 A1* 11/2017 Masaeli ................. G06V 10/82
2019/0251330 A1* 8/2019 Cotte ....................... G01N 1/30
(Continued)

FOREIGN PATENT DOCUMENTS

WO 2013028926 A2 2/2013

OTHER PUBLICATIONS

Daniele Pirone, et al., "Tracking-Based Rolling Angles Recovery Method for Holographic Tomography of Flowing Cells", Algorithms and Technologies for Multispectral, Hyperspectral, and Ultraspectral Imagery XIX—Proceedings of SPIE, vol. 11786, pp. 1-6, 2021.
(Continued)

*Primary Examiner* — Amandeep Saini
*Assistant Examiner* — Mehrazul Islam
(74) *Attorney, Agent, or Firm* — LUCAS & MERCANTI, LLP

(57) ABSTRACT

The present invention relates to a computer-implemented method and corresponding apparatus for the accurate identification of subcellular structures from tomographic reconstructions. This invention allows to extract the 3D subcel-
(Continued)

lular specificity directly from the tomographic phase-contrast data obtained from a typical flow cytometry configuration or any other experimental tomographic systems able to provide 3D quantitative phase-contrast tomograms. In particular, subcellular structures can be identified by using a novel computational segmentation method based on statistical inference from any 3D phase-contrast tomographic data.

28 Claims, 6 Drawing Sheets

(51) Int. Cl.

| | |
|---|---|
| ***G01N 15/1429*** | (2024.01) |
| ***G01N 15/1434*** | (2024.01) |
| ***G06N 20/00*** | (2019.01) |
| ***G06V 10/25*** | (2022.01) |
| ***G06V 10/26*** | (2022.01) |
| ***G06V 10/34*** | (2022.01) |
| ***G06V 10/44*** | (2022.01) |
| ***G06V 10/762*** | (2022.01) |
| ***G06V 20/69*** | (2022.01) |
| ***G16H 50/20*** | (2018.01) |
| *G01N 15/10* | (2006.01) |

(52) U.S. Cl.
CPC ......... *G01N 15/1434* (2013.01); *G06V 10/25* (2022.01); *G06V 10/273* (2022.01); *G06V 10/34* (2022.01); *G06V 10/443* (2022.01); *G06V 10/762* (2022.01); *G06V 20/698* (2022.01); *G01N 2015/1006* (2013.01)

(58) Field of Classification Search
CPC .... G06V 10/762; G06V 20/698; G06V 20/69; G01N 15/01; G01N 15/1429; G01N 15/1434; G01N 2015/1006; G06F 18/2321
See application file for complete search history.

(56) References Cited

U.S. PATENT DOCUMENTS

| | | | | |
|---|---|---|---|---|
| 2021/0003698 | A1* | 1/2021 | Toriya | G06V 20/13 |
| 2022/0088070 | A1* | 3/2022 | Albertson | A61K 39/3955 |

OTHER PUBLICATIONS

Rubbiya A. Ali, et al., RAZA: A Rapid 3D Z-Crossing Algorithm to Segment Electron Tomograms and Extract Organelles and Macromolecules, Journal of Structural Biology, vol. 200, No. 2, pp. 73-86, 2017.

Jose-Jesus Fernandez, "Computational Methods for Electron Tomography", Micron, vol. 43, No. 10, pp. 1010-1030, 2012.

Daniele Pirone, et al., "Stain-Free Nucleus Identification in Holographic Learning Flow Cyto-Tomography", BIORXIV, pp. 1-20, 2021.

International Search Report and Written Opinion for Corresponding International Application No. PCT/IB2022/056625, 15 pages, Oct. 5, 2022.

* cited by examiner

COMPUTER-IMPLEMENTED METHOD AND CORRESPONDING APPARATUS FOR IDENTIFYING SUBCELLULAR STRUCTURES IN THE NON-CHEMICAL STAINING MODE FROM PHASE CONTRAST TOMOGRAPHY RECONSTRUCTIONS IN FLOW CYTOMETRY

CROSS-REFERENCE TO RELATED APPLICATIONS

This application is a 371 of PCT/IB2022/056625, filed Jul. 19, 2022, which claims the benefit of priority from Italian Patent Application No. 102021000019490, filed Jul. 22, 2021.

TECHNICAL FIELD

The present invention relates to a computer-implemented method and corresponding apparatus for accurate identification of subcellular structures from tomographic reconstructions, thus permitting to extract the 3D subcellular specificity directly from the phase-contrast data in a typical cytometry configuration. In particular, subcellular structures can be identified by using a novel computational segmentation method based on statistical inference, applied to cells suspended in a flow channel.

BACKGROUND

Traditional tools of histopathology analysis will evolve soon and the future of precision medicine will pass through the accurate screening and measurement of single cells. A key challenge that will allow to make the next jump forward is achieving a more informative label-free microscopy. In fact, avoiding staining is of fundamental importance as it will permit one to access non-destructive, rapid, and chemistry-free analysis in biology, thus triggering new queries and new answers in biology and medicine. Statistically relevant investigations on a large number of cells will be mandatory, as cellular populations are heterogeneous and thus possible therapies will be necessarily based on high-throughput screening technologies. Nowadays, the gold standard imaging tool in cell biology is fluorescence microscopy (FM). Since biological samples are transparent objects, they mainly introduce phase delays on the incident optical radiation, changing only minimally its amplitude component. Therefore, in FM, stains or fluorescent tags are used to make them visible on a selective basis. However, fluorescent imaging is generally qualitative and limited by photobleaching and phototoxicity of the fluorescent proteins or dyes (exogenous contrast agents). Moreover, chemical toxicity can alter the normal cellular morphology and physiology, thus introducing undesired falsehoods on the observed images. Finally, sample preparation protocols can be expensive, time-consuming, and operator-sensitive, i.e. different users can obtain different FM results within the same experiment.

Quantitative Phase Imaging (QPI) is emerging as a very useful tool in label-free microscopy and recently many significant results have been achieved in this field. QPI can allow a non-invasive and quantitative measurement of significant parameters in unlabelled cells correlated to their health state, e.g. cellular dry-mass and dry-density. In QPI, phase-contrast is due to the optical path length difference between the unlabelled biological specimen and its background due to the combination of thickness and refractive index (RI). These two quantities can be decoupled by recording multiple two-dimensional (2D) Quantitative Phase Maps (QPMs) at different viewing angles around the sample and performing the three-dimensional (3D) Optical Diffraction Tomography (ODT). Hence, ODT is a label-free optical microscopy technique that allows the 3D RI mapping of a biological specimen. RI is an intrinsic optical feature associated with cell biophysical properties (mass density, biochemical, mechanical, electrical, and optical), therefore ODT provides a full quantitative measurement of 3D morphologies and RI volumetric distribution at the single-cell level. ODT has been exploited for studying different cells, e.g. red blood cells, yeast cells, cancer cells, chromosomes, white blood cells, lipid droplets, and cell pathophysiology.

However, the advantages of stain-free imaging of QPI are counterbalanced by the lack of subcellular specificity. In fact, it is very difficult to ascertain and extract the 3D boundary of subcellular structures based solely on the RI values. Among all subcellular structures, the nucleus is the principal one in the eukaryotic cells, since it contains most of the cellular genetic material and it is responsible for the cellular lifecycle. Quantitative and label-free morphological biomarkers identified from nuclei could greatly enlarge the knowledge about cell physiology and in particular cancer diagnosis in histopathology (Backman, V. et al. Detection of preinvasive cancer cells. Nature 406, 35-36 (2000)). In fact, it has been proven that the nucleus-to-cytoplasm ratio increases in a cancer cell, as well as the phase value. For instance, significant changes in nuclear RI have been measured in breast cancer. Moreover, the efficacy of cancer therapies can be enhanced through a precise nuclear characterization. Identification of the nucleus-like region in label-free 3D imaging is a challenging task since the nuclear size and RI vary among different cell lines, as well as within the same cell line, and even within the same cell depending on its lifecycle. In addition, different subcellular structures show similar RI values, thus making any threshold-based detection method ineffective. A possible solution is to isolate the nucleus from the outer cell by a chemical etching process and then make direct label-free measurements. However, this approach is destructive and also led to debated results.

Recently, significant progresses have been reported to introduce specificity in QPI by computational approaches based on artificial intelligence (AI). In particular, a Generative Adversarial-Network (GAN) has been employed to virtually stain unlabelled tissues (Rivenson, Y. et al. PhaseStain: the digital staining of label-free quantitative phase microscopy images using deep learning. Light.: Sci. Appl. 8, 23 (2019)) as well as single cells (Nygate, Y. N. et al. Holographic virtual staining of individual biological cells. Proc. Natl. Acad. Sci. USA 117, 9223-9231 (2020)) in QPMs, i.e. in a 2D imaging case. Instead, for the 3D imaging case, nuclei of unlabelled and adhered cells have been identified using a Convolutional Neural Network (CNN) to introduce specificity in ODT reconstructions. Moreover, digital staining through the application of deep neural networks has been successfully applied to multi-modal multi-photon microscopy in histopathology of tissues. In another work, a neural network has been used to translate autofluorescence images into images that are equivalent to the bright-field images of histologically stained versions of the same samples, thus achieving virtual histological staining (Rivenson, Y. et al. Deep learning-based virtual histology staining using auto-fluorescence of label-free tissue. arXiv: 1803.11293 (2018)).

In particular, about nucleus specificity, virtual staining-based segmentation makes 2D label-free QPI equivalent to 2D FM, both in static and flow cytometry environments. Moreover, CNN-based segmentation makes 3D label-free ODT equivalent to well-established 3D confocal microscopy, but only for static analysis of fixed cells at rest on a surface. Instead, the specificity property of confocal microscopy has not been replicated yet on suspended cells in a label-free manner. Furthermore, in FM, cyto-fluorimetry is the gold standard for histopathological analysis of biological samples, while its high throughput allows statistically relevant results. In fact, unlike other methods that measure averaged signals from a population of cells, in cyto-fluorimetry, thousands of cells per second can be analyzed individually. However, FM cyto-fluorimetry involves only 2D images.

Thus, there is still a need to provide methods and systems to identify and/or quantify the subcellular structures in the non-chemical staining mode.

SUMMARY OF THE INVENTION

The authors of the present invention have developed an alternate strategy to achieve specificity in label-free bioimaging proposing a new 3D shape retrieval method, named herein as Computational Segmentation based on Statistical Inference (CSSI), to identify subcellular structures in 3D Optical Diffraction Tomography (ODT) reconstructions in flow cytometry. To this aim, two recently established methods have been combined, tomographic flow cytometry by digital holography (DH) to record Quantitative Phase Maps (QPMs) of flowing and rotating cells and learning tomographic reconstruction algorithm, thus obtaining an in-flow 3D learning cyto-tomography system. The method of the present invention is completely different than the others known in the art. In fact, deep learning techniques are based on neural networks that must be previously trained through FM images. They can replicate only results about the specific situations they have been exposed to during the learning process. Moreover, the deep learning process needs a more complex recording system, that must be multimodal to acquire simultaneously both FM and label-free images of the same sample, in order to feed the neural network. Instead, the proposed CSSI method is fully applicable to any types of cells since it avoids the learning step and exploits a robust ad hoc clustering algorithm, i.e. it recognizes statistical similarities among the subcellular structure voxels. Furthermore, it is important to underline that, for the first time is posed the problem of delineating the stain-free subcellular structures in 3D within a single suspended cell and within single-cells flowing in a microfluidic cytometer, whose corresponding 3D FM technology does not exist.

Therefore, beyond the numerical assessment through virtual 3D cell phantoms, the CSSI algorithm can fill the specificity gap with 2D FM cyto-fluorimetry and with 3D FM confocal microscopy, but in the more difficult case of suspended cells. Imaging of suspended cells has a great advantage as the cells can be individually analyzed in-flow, i.e. in a high-throughput modality. However, while FM specificity leads to an indirect qualitative visualization of the subcellular elements, CSSI allows for direct measurements of intrinsic 3D parameters (morphology, RI, and their derivatives) of subcellular structures, thus providing a whole label-free quantitative characterization exploitable for analyzing large numbers of single-cells.

Hence, objects of the present invention are:

A computer-implemented method for identifying a subcellular structure of a cell analysed by a cyto-tomographic technique, which method comprises the following steps:

i) retrieving the 3D Refractive Index (RI) tomogram of said cell;
ii) identifying a single voxel supposed belonging to said subcellular structure of interest;
iii) defining a reference cloud of voxels ($C_R$) having as the center said voxel in ii), wherein said cloud of voxels ($C_I$) means a group of adjacent voxels belonging to a cube having a side of ε pixels;
iv) calculating the statistical similarity between the reference cloud of voxels and all the other non-overlapped clouds of voxels of the same size by using a statistical similarity test, wherein the said test can be one of the hypothesis test on the mean value;
v) grouping the clouds of voxels having simultaneously higher statistical similarity and spatial proximity among them and respect to the references cloud of voxels;
vi) removing statistical outlier clouds of voxels erroneously grouped in v), wherein said outliers are clouds of voxels that differ significantly from other clouds of voxels grouped in v);
vii) repeating steps iii) to vi) by setting as the reference cloud of voxels a sub-group of voxels randomly selected from the grouped clouds of voxels of vi) with a halved value of ε;
viii) repeating K times steps iii) to vii) to create K estimations of the said subcellular structure of interest;
ix) adding up all the K estimations in viii) to create the tomogram of occurrences, wherein said tomograms of occurrences is the tomogram wherein each voxel can take integer values within [0, K], according to how many times that voxel has been included within an estimation of said subcellular structure of interest;
x) defining a threshold value for each voxel belonging to the tomograms of occurrence for which values greater than said threshold is assigned to the said subcellular structure of interest;

A computer program comprising instructions which, when the program is executed by a computer, cause the computer to carry out the method described in the present specification and in the claims;

A computer-readable data carrier having stored thereon the above-mentioned computer program;

An apparatus suitable for carrying out tomographic analysis on a cell or on a group of cells, comprising a data processing device configured to execute the above-mentioned computer program, and/or the computer-readable data carrier.

Additional advantages and/or embodiments of the present invention will be evident from the following detailed description.

BRIEF DESCRIPTION OF THE DRAWINGS

The present invention and the following detailed description of preferred embodiments thereof may be better understood with reference to the following figures.

The methods in the boxes at the bottom left allow to fill the specificity gap between the label-free and fluorescent techniques (dashed lines). The proposed technology (filled boxes) fills a blank in the bioimaging realm because, in terms of specificity, the statistics-based segmentation (CSSI method) makes the in-flow 3D learning cyto-tomography consistent with both the 2D FM flow-cytometry and the 3D FM confocal microscopy of suspended cells. Moreover, it emulates a non-existent FM technique, i.e. the in-flow confocal microscopy. The two thickest dashed lines indicate the fluorescence techniques that have been used to validate the accuracy of the proposed method, and they also point to which conventional fluorescence techniques could be replaced by our technique.

Figure 2:
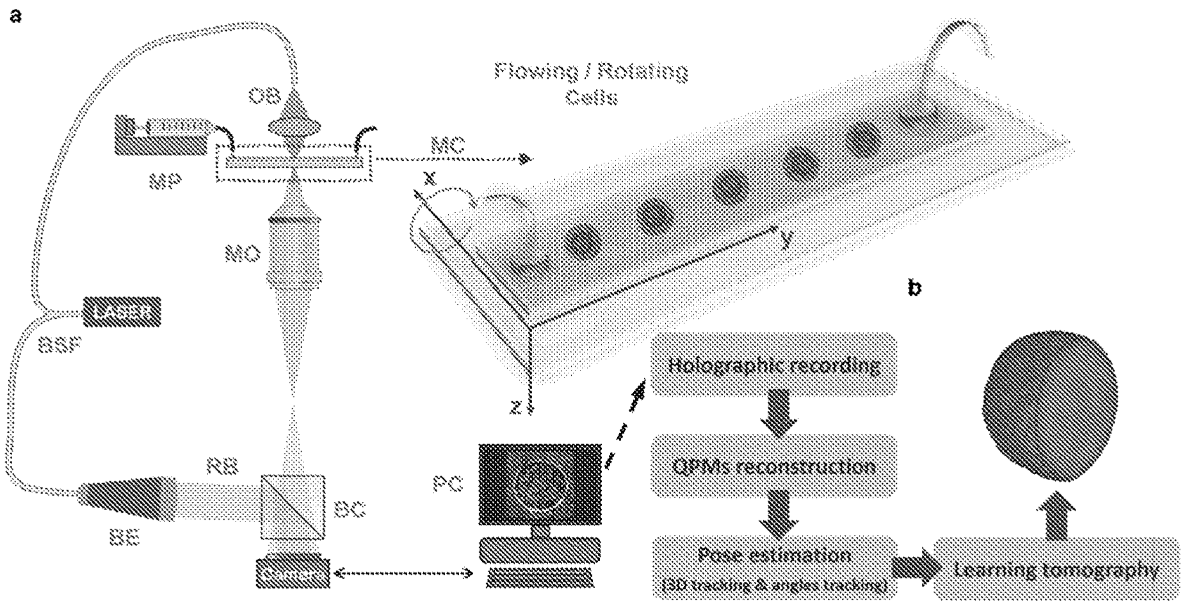

FIG. 2: 3D learning flow cyto-tomography technique. A sketch of the in-flow ODT setup based on a DH microscope in off-axis configuration. BSF, Beam Splitter Fiber; MP, Microfluidic Pump; MC, Microfluidic Channel; OB, Object Beam; MO, Microscope Objective; BE, Beam Expander; RB, Reference Beam; BC, Beam Combiner; PC, Personal Computer. b Block diagram of the holographic processing pipeline to reconstruct the stain-free 3D RI tomograms of flowing and rotating single-cells.

Figure 3:
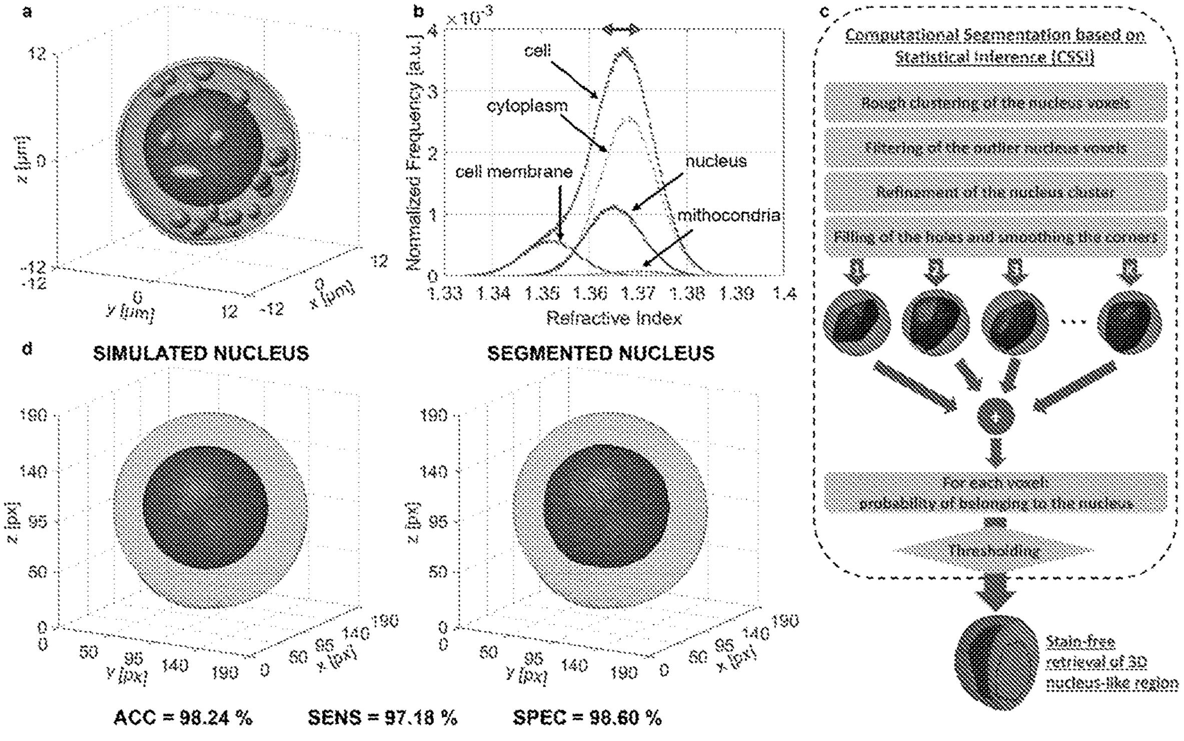

FIG. 3: Numerical assessment of the CSSI algorithm applied to segment the 3D nucleus-like regions from a 3D numerical cell phantom. a Isolevels representation of the 3D cell model, simulated with four sub-cellular components, i.e. cell membrane, cytoplasm, nucleus, and 18 mitochondria. b Histogram of the RI values assigned to each simulated sub-cellular structure in (a). The arrow at the top highlights the RI values assigned to the transition region between the nucleus and cytoplasm. c Block diagram of the CSSI method to segment the nucleus-like region from a stain-free 3D RI tomogram. d Visual comparison between the simulated 3D nucleus and the 3D nucleus-like region segmented from the simulated RI tomogram in (a). The simulated nucleus and the segmented nucleus are the dark structures within the outer cell shell. The clustering performances obtained in this simulation are reported below.

Figure 4:
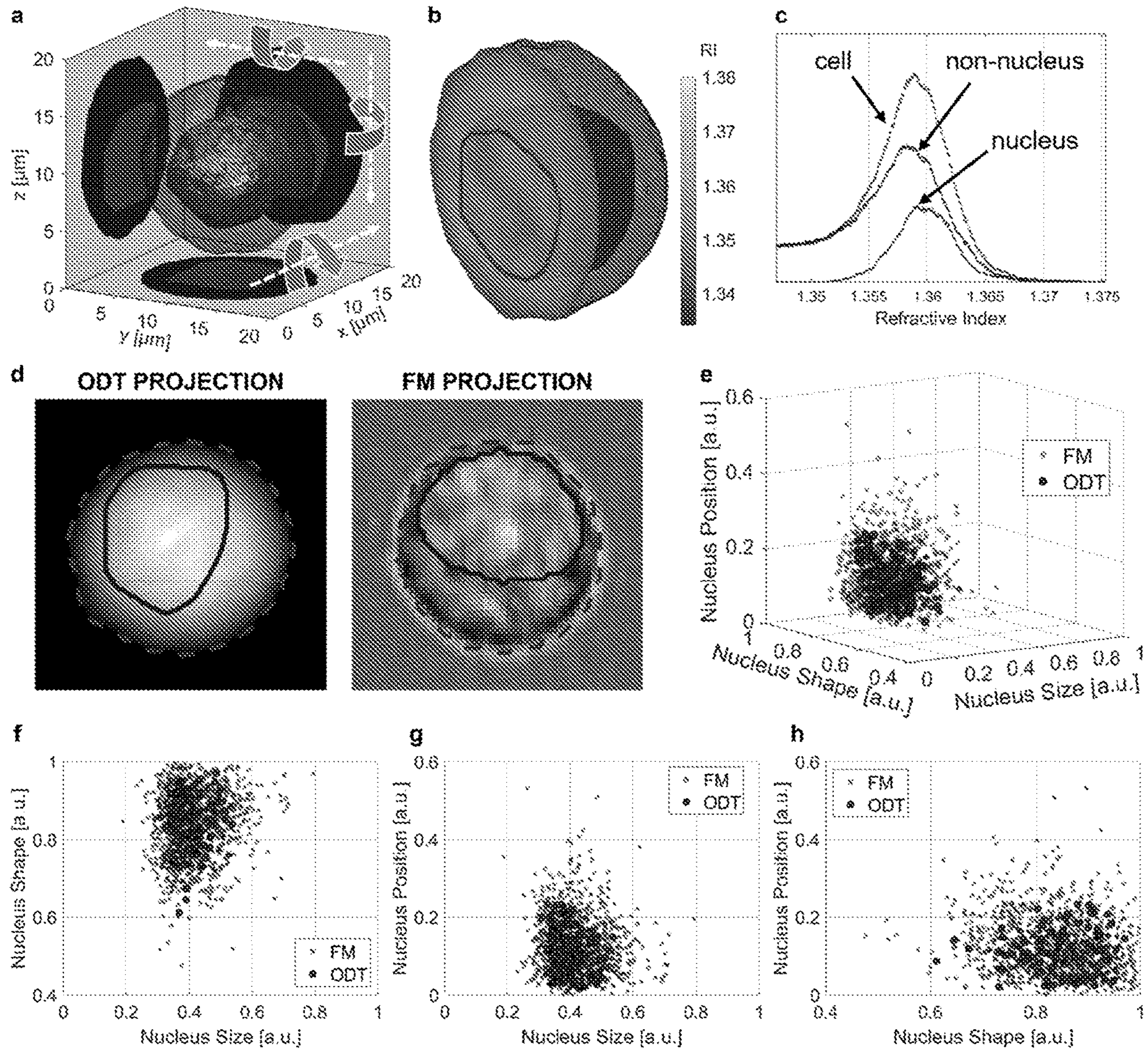

FIG. 4: Experimental assessment of the CSSI algorithm applied to segment the 3D nucleus-like regions from unlabelled in-flow ODT reconstructions of five SK-N-SH cells, by comparison with the morphological parameters measured through a 2D FM cyto-fluorimeter. a 3D segmented nucleus (dark inner structure) within the 3D cell shell (outer structure) of an SK-N-SH cell reconstructed by ODT. The segmented tomogram is rotated around the x-, y- and z-axes (dark arrows) and then reprojected along the z-, x- and y-axes (white arrows), thus obtaining 2D ODT segmented projections in xy-, yz- and xz-planes, respectively. b Central slice of the isolevels representation in (a), with nucleus marked by the dark line. c RI histogram of the SK-N-SH cell in (a,b) reconstructed by 3D in-flow ODT, along with the RI distributions of its 3D nucleus-like region and non-nucleus one segmented by CSSI algorithm. d 2D segmented projection with nucleus (solid line) and non-nucleus (dashed line) regions, obtained (on the left) by reprojecting 3D unlabelled ODT RI reconstruction in (a,b) and (on the right) by recording 2D labeled FM images. The scale bar is 5 μm. e 3D scatter plot of nucleus size vs nucleus shape vs nucleus position measured in 1280 FM (light dots) and 90 ODT (dark dots) 2D projections. Nucleus size is NCAR, nucleus shape is NAR, and nucleus position is NNCCD. f-h 2D scatter plots of nucleus size vs nucleus shape, nucleus size vs nucleus position, and nucleus shape vs nucleus position, respectively, containing the same points in (e).

Figure 5:
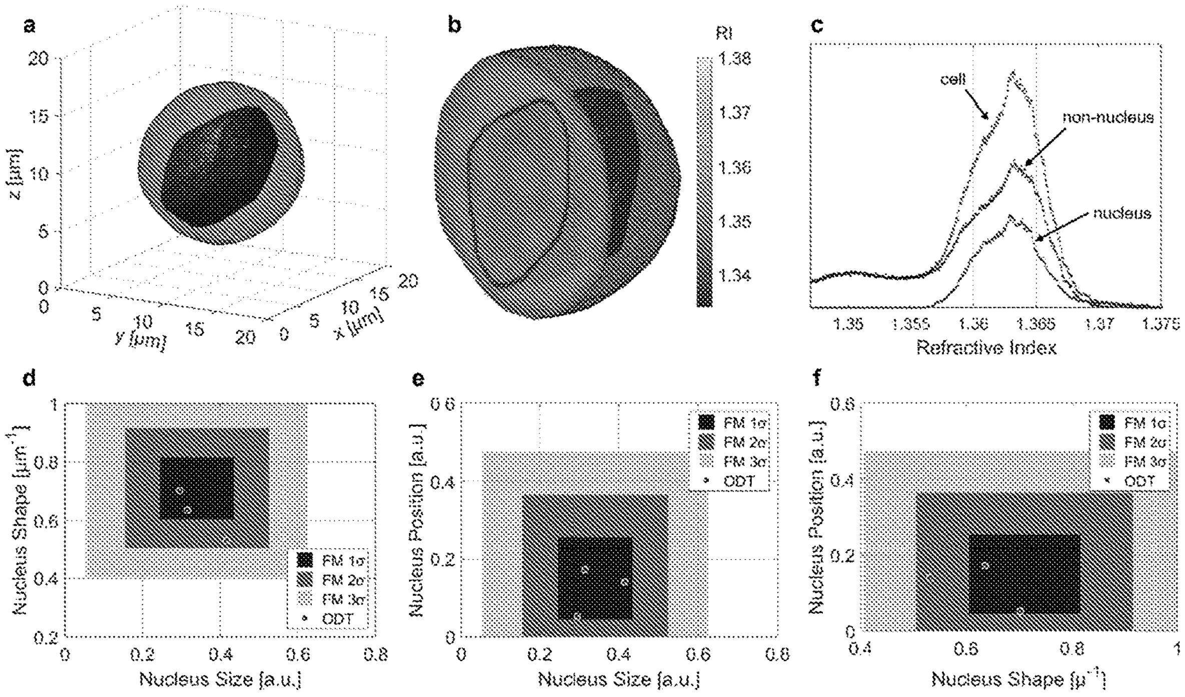

FIG. 5: Experimental assessment of the CSSI algorithm applied to segment the 3D nucleus-like regions from unlabelled in-flow ODT reconstructions of three MCF-7 cells, by comparison with the morphological parameters measured through a 3D FM confocal microscope. a 3D segmented nucleus-like region (dark inner structure) within unlabelled 3D cell shell (outer structure) reconstructed through in-flow ODT. b Central slice of the isolevels representation in (a), with nucleus marked by the dark line. c RI histogram of the MCF-7 cell in (a,b) reconstructed by 3D in-flow ODT, along with the RI distributions of its 3D nucleus-like region and non-nucleus one segmented by CSSI algorithm. d-f Scatter plots of nucleus size vs nucleus shape, nucleus size vs nucleus position, and nucleus shape vs nucleus position, respectively, measured in three segmented ODT MCF-7 nuclei (dots) along with the corresponding FM intervals (rectangles) around the average values, with half-width 1σ, 2σ, and 3σ (σ is the standard deviation of the measurements). Nucleus size is NCVR, nucleus shape is NSVR, and nucleus position is NNCCD.

Figure 6:
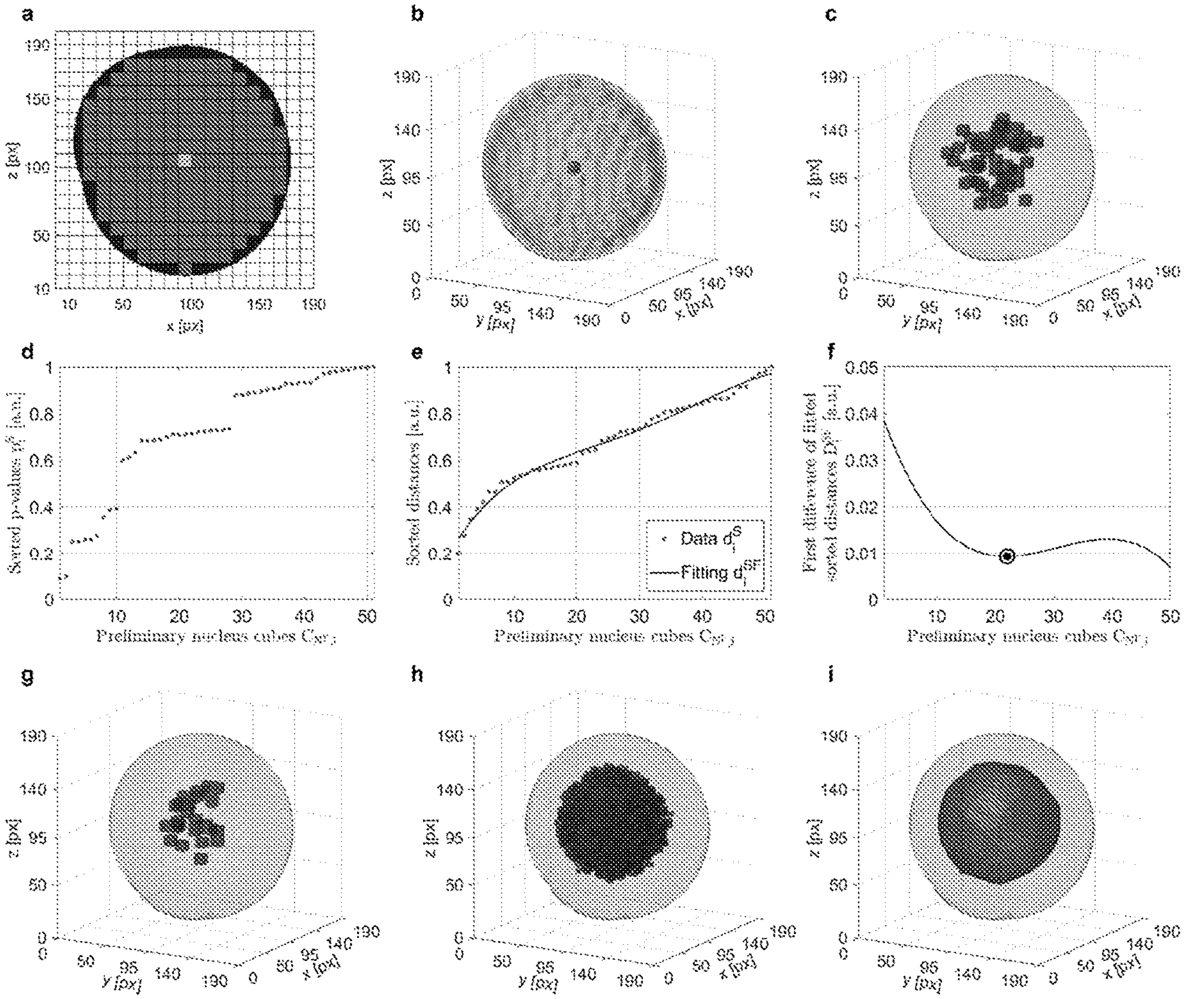

FIG. 6: CSSI of the stain-free nucleus-like region in a 3D numerical cell phantom. a Central xz-slice of the 3D array divided into distinct cubes with edge ε=10 px. The central reference cube $C_R$ (light gray) and the investigated cubes $C_I$ (dark gray) are highlighted within the cell shell (black). b 3D array from which the central xz-slice in (a) has been selected. c Preliminary nucleus set $\mathcal{N}^P$ made of ε-cubes classified nucleus after a first rough clustering. d Vector of sorted p-values $$\overline{p}^S$$

computed through the WMW test between each cube $C_{\mathcal{N}^P,i}$ in the preliminary nucleus set $\mathcal{N}^P$ and the reduced nucleus set $$\mathcal{N}_i^{P-},$$

with i=1, 2, . . . , n. e Vector of sorted and normalized Euclidean distances $$\overline{d}^S$$

(dots) between each cube $C_{\mathcal{N}^P,i}$ in the preliminary nucleus set $\mathcal{N}^P$ and the centroid of all cubes in $\mathcal{N}^P$, along with the fourth-degree polynomial fitting $$\overline{d}^{SF}$$

(line), with i=1, 2, . . . , n. f First difference $$\overline{D}^{SF}$$

(line) of vector of fitted sorted distances $$\vec{d}^{SF}$$

in (b), with highlighted the lowest value with null slope (dot). g Filtered nucleus set $\mathcal{N}^F$ made of ε-cubes classified nucleus after a spatial and statistical filtering of the preliminary nucleus set $\mathcal{N}^P$ in (c). h Refined nucleus set $\mathcal{N}^R$ made of ε/2-cubes classified nucleus after increasing resolution in the filtered nucleus set $\mathcal{N}^F$ in (d) through sub-cubes of size ε/2. i Partial nucleus set $\mathcal{N}_j$ obtained by linking sub-cubes in (e) through segment lines and by using morphological closing. In (b,c,g-i), the outer region is the cell shell and the dark inner region is the segmented nucleus at different steps of the CSSI algorithm.

Figure 7:
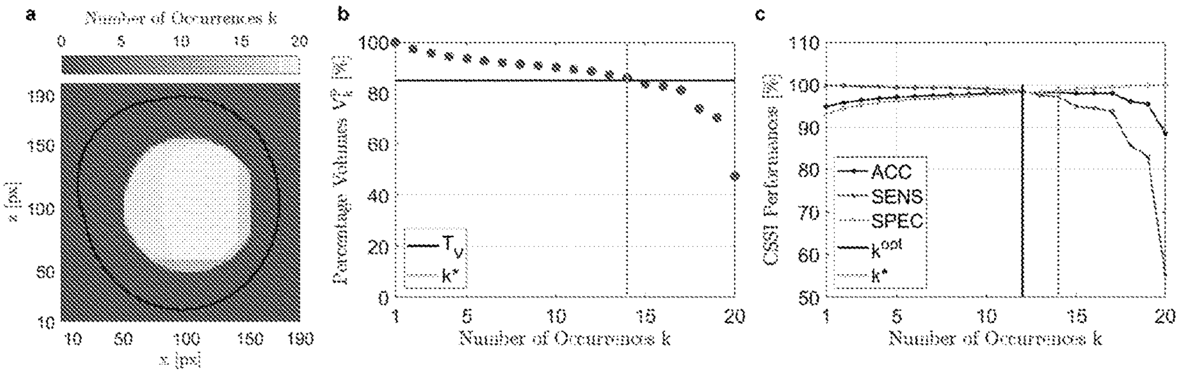

FIG. 7. Setting of the estimated threshold k*. a Central xz-slice of the tomogram of occurrences, in which each voxel can take an integer value k from 0 to K=20, i.e. the number of times it has been classified nucleus after repeating K times steps 1-7 of the CSSI algorithm on the same cell. The dark line is the cell contour. b Percentage volumes $$V_k^P$$

(dots), i.e. number of voxels $V_k$ classified nucleus at least k times normalized to $V_{20}$, along with the threshold $T_V$ (horizontal line) used to find the estimated threshold k* (vertical line) by an intersection analysis. c CSSI performances associated to each possible threshold k for creating the final 3D nucleus-like set N, expressed in terms of accuracy (black dotted line), sensitivity (dark gray dotted line) and specificity (light gray dotted line), along with the optimum threshold $k^{opt}$ (vertical dark line in which performances are simultaneously maximized) and its estimation k* (vertical light line) computed in (b).

Figure 8:
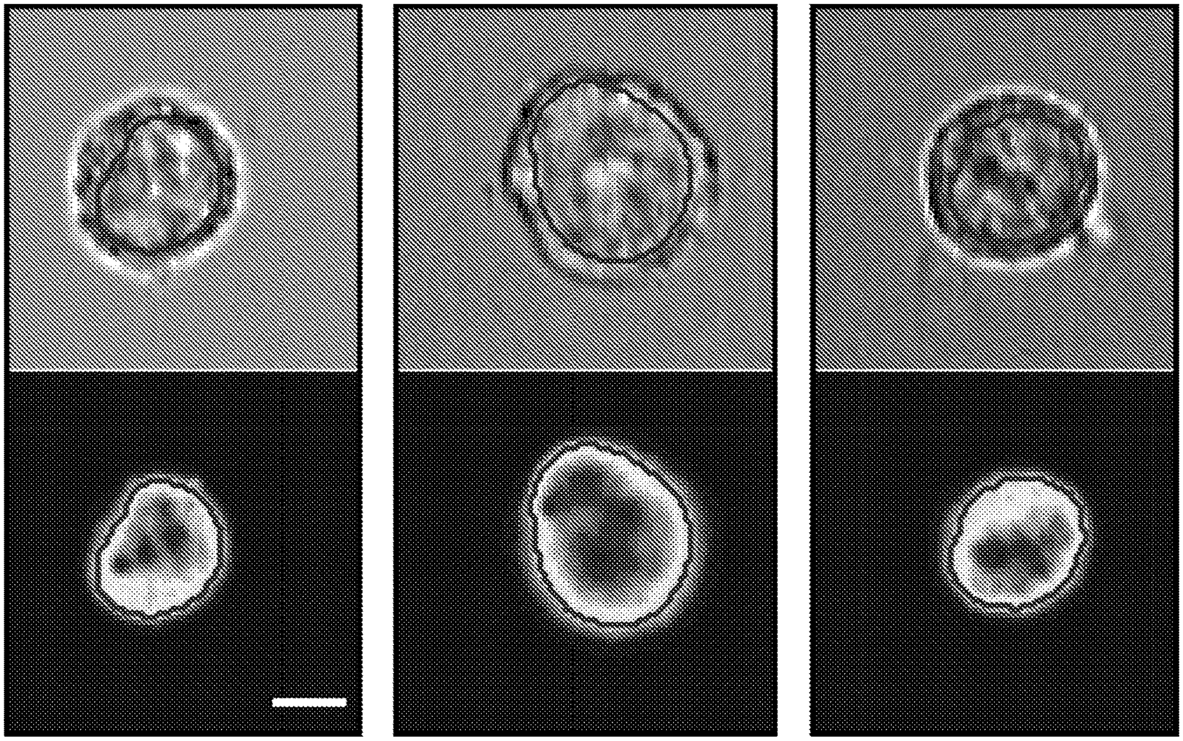

FIG. 8. 2D cyto-fluorimetric images of SK-N-SH cells recorded by Amnis ImageStreamX®. Three cells recorded simultaneously in brightfield images (top) and fluorescent images with the stained nucleus (bottom). The contour of the nucleus segmented by using the fluorescence information is overlapped by the dark line. Scale bar is 5 μm.

DETAILED DESCRIPTION

In the following, several embodiments of the invention will be described. It is intended that the features of the various embodiments can be combined, where compatible. In general, subsequent embodiments will be disclosed only with respect to the differences with the previously described ones.

As previously mentioned, a first object of the present invention is represented by A computer-implemented method for identifying a subcellular structure of a cell analysed by a cyto-tomographic technique, which method comprises the following steps:

i) retrieving the 3D Refractive Index (RI) tomogram of said cell;

ii) identifying a single voxel supposed belonging to said subcellular structure of interest;

iii) defining a reference cloud of voxels ($C_R$) having as the center said voxel in ii), wherein said cloud of voxels ($C_I$) means a group of adjacent voxels belonging to a cube having a side of ε pixels;

iv) calculating the statistical similarity between the reference cloud of voxels and all the other non-overlapped clouds of voxels of the same size by using a statistical similarity test, wherein the said test can be one of the hypothesis test on the mean value;

v) grouping the clouds of voxels having simultaneously higher statistical similarity and spatial proximity among them and respect to the references cloud of voxels;

vi) removing statistical outlier clouds of voxels erroneously grouped in v), wherein said outliers are clouds of voxels that differ significantly from other clouds of voxels grouped in v);

vii) repeating steps iii) to vi) by setting as the reference cloud of voxels a sub-group of voxels randomly selected from the grouped clouds of voxels of vi) with a halved value of ε;

viii) repeating K times steps iii) to vii) to create K estimations of the said subcellular structure of interest;

ix) adding up all the K estimations in viii) to create the tomogram of occurrences, wherein said tomograms of occurrences is the tomogram wherein each voxel can take integer values within [0, K], according to how many times that voxel has been included within an estimation of said subcellular structure of interest;

x) defining a threshold value for each voxel belonging to the tomograms of occurrence for which values greater than said threshold is assigned to the said subcellular structure of interest.

As used herein, the expression "retrieving 3D Refractive Index (RI) tomograms" means that the tomograms acquired from the analysis of a cell by a cyto-tomographic technique are retrieved and used to carry out the method described herein.

The term "clustering" and the term "grouping" refers to is the task of grouping a set of objects in such a way that objects in the same group (called a cluster) are more similar (in some sense) to each other than to those in other groups (clusters). It is a main task of exploratory data analysis, and a common technique for statistical data analysis, used in many fields, including pattern recognition, image analysis, information retrieval, bioinformatics, data compression, computer graphics and machine learning. Cluster analysis itself is not one specific algorithm, but the general task to be solved. It can be achieved by various algorithms that differ significantly in their understanding of what constitutes a cluster and how to efficiently find them. Popular notions of clusters include groups with small distances between cluster members, dense areas of the data space, intervals or particular statistical distributions. Clustering can therefore be formulated as a multi-objective optimization problem. The appropriate clustering algorithm and parameter settings (including parameters such as the distance function to use, a density threshold or the number of expected clusters) depend on the individual data set and intended use of the results. Cluster analysis as such is not an automatic task, but an iterative process of knowledge discovery or interactive multi-objective optimization that involves trial and failure. It is often necessary to modify data preprocessing and model parameters until the result achieves the desired properties.

Thereafter, the term "voxel" refers to the three-dimensional counterpart of the two-dimensional pixel (representing the unit of area), and therefore the volume buffer (a large 3D array of voxels) of voxels can be considered as the three-dimensional counterpart of the two-dimensional frame buffer of pixels. The term "voxel cloud" refers to a group of voxels inside the cell, not necessarily connected to each other.

As described herein, the term "subcellular structure" refers to structures that are within a cell.

The term "outlier" means a data point that differs significantly from other observations. An outlier may be due to variability in the measurement or it may indicate experimental error; the latter are sometimes excluded from the data set. An outlier can cause serious problems in statistical analyses. Outliers can occur by chance in any distribution, but they often indicate either measurement error or that the population has a heavy-tailed distribution. In the former case one wishes to discard them or use statistics that are robust to outliers, while in the latter case they indicate that the distribution has high skewness and that one should be very cautious in using tools or intuitions that assume a normal distribution. A frequent cause of outliers is a mixture of two distributions, which may be two distinct sub-populations, or may indicate 'correct trial' versus 'measurement error'; this is modelled by a mixture model. In most larger samplings of data, some data points will be further away from the sample mean than what is deemed reasonable. This can be due to incidental systematic error or flaws in the theory that generated an assumed family of probability distributions, or it may be that some observations are far from the center of the data. Outlier points can therefore indicate faulty data, erroneous procedures, or areas where a certain theory might not be valid. However, in large samples, a small number of outliers is to be expected (and not due to any anomalous condition).

In an embodiment, said statistical similarity test exploited in step iv) of the method herein described, is the Wilcoxon-Mann-Whitney test (WMW), used for determining a null hypothesis $H_0$ which is that the two sets of values have been drawn from the same distribution.

In a further embodiment, according to any one of the embodiments disclosed, said null hypothesis $H_0$ of said WMW test can or cannot be rejected depending on the following cases, respectively:

a) $H_0$ is not rejected with the significance level $\gamma$ if the p-value is greater than or equal to $\gamma$ b) $H_0$ is rejected with significance level $\gamma$ if the p-value is lower than $\gamma$ wherein the said significance level $\gamma$ is the probability to reject the null hypothesis $H_0$ when $H_0$ is true, and said p-value is the probability of obtaining test results at least as extreme as the result actually observed, under the assumption that the null hypothesis H0 is correct.

The significance level $\gamma$ is the probability of making an error of 1st species, i.e. of rejecting the null hypothesis $H_0$ when it is true. The confidence level is defined as $1-\gamma$, i.e. it is the probability of not rejecting the null hypothesis $H_0$ when it is true.

The p-value is the observed significance level, i.e. the smallest significance level at which $H_0$ is rejected. It can be also defined as the probability of obtaining results at least as extreme as the results actually observed, when the null hypothesis $H_0$ is true. Therefore, a low p-value leads to reject the null hypothesis $H_0$, because it means that such an extreme observed result is very unlikely when the null hypothesis $H_0$ is true.

In an embodiment of the present invention, according to any one of the embodiments herein described, the cloud of reference ($C_R$) is a cube containing $\varepsilon^3$ voxels supposed belonging to the subcellular structure of interest, chosen among the cubes obtained by centering the cell 3D Refractive Index Tomogram in its $L_x \times L_y \times L_z$ array and dividing it into distinct cubes, each of which has an edge measuring $\varepsilon$ pixel.

In a further embodiment, according to any one of the embodiments herein disclosed, said investigated clouds ($C_I$) are cubes completely contained within the cell shell of the 3D Refractive Index Tomogram of the analyzed cell centered in its $L_x \times L_y \times L_z$ array, and divided into distinct cubes, each of which has an edge measuring $\varepsilon$ pixel. The investigated cubes do not comprise the reference cube.

Furthermore, in an embodiment said WMW test is carried out computing the p-value of each of said investigated cubes ($C_I$) with respect to said reference cube ($C_R$), thus obtaining a variable threshold $T_P$ value according to the p-values chosen as the maximum value less than or equal to $\tau$ such that for at least one $C_I$ it happens that p-value is higher or equal to $T_P$.

$\tau$ is an upper bound for the TP threshold. It can preferably be set to 0.9.

In another embodiment of the invention, in accordance with any one of the embodiments herein disclosed, said grouping step v) is performed through repeated M-iterations loops, thus creating a preliminary subcellular structure set $N^P$. M is an integer number. It can preferably be set to 10. Each M-iterations loop comprises the following steps:

a) creating a temporary set $\mathcal{N}^T$ with the RIs of the sole reference cube $C_R$;

b) at each of M iterations i. creating a reference set $\mathcal{R}$ by randomly drawing $\varepsilon^3$ values from the temporary set $\mathcal{N}^T$;

ii. computing for each investigated cube $C_I$, the corresponding p-value with respect to the reference set $\mathcal{R}$ through the WMW test;

iii. adding the investigated cubes $C_I$ such that their p-value$\geq T_P$ to the temporary set $\mathcal{N}^T$;

c) moving after an M-iterations loop, all the investigated cubes $C_I$ added to the temporary set $\mathcal{N}^T$ to the preliminary subcellular structure set $\mathcal{N}^P$, and then resetting the temporary set $\mathcal{N}^T$;

d) repeating steps a)-c) until at least n investigated cubes $C_I$ have been stored within the preliminary subcellular structure set $\mathcal{N}^P$.

In a further embodiment of this invention, according to any one of the embodiments herein disclosed said step iv) of removing statistical outliers comprises the following steps in order to delete outlier cubes from the preliminary subcellular structure set $\mathcal{N}^P$, thus creating a filtered subcellular structure set $\mathcal{N}^F$ Let $C_{\mathcal{N}^P,i}$ be a cube within $\mathcal{N}^P$, with i=1, 2, . . . , n.

a) Creating the reduced subcellular structure set $$\mathcal{N}_i^{P-}$$

after removing the cube $C_{\mathcal{N}^P,i}$ from the preliminary subcellular structure set $\mathcal{N}^P$, with i=1, 2, . . . , n.

b) Creating a p-value vector $\overline{p}$ of length n, which i-th element is the p-value computed through the WMW test between the cube $C_{\mathcal{N}^P,i}$ and the reduced subcellular structure set $$\mathcal{N}_i^{P-}.$$

c) Creating a distance vector $\overline{d}$ of length n, which i-th element is the Euclidean distance between the centre of cube $C_{\mathcal{N}^P,i}$ and point B, i.e. the centroid of the preliminary subcellular structure set $\mathcal{N}^P$.

d) Sorting the p-value vector $\overline{p}$ in ascending order, thus obtaining the sorted p-value vector $$\overline{p}^S.$$

e) Sorting the distance vector $$\overline{d}$$

in ascending order and normalizing said vector to its maximum, thus obtaining the sorted distance vector $$\overline{d}^S.$$

Both vectors $$\overline{p}^S$$

and $$\overline{d}^S$$

are used to remove outlier cubes within the preliminary subcellular structure set $\mathcal{N}^P$. In fact, a cube $C_{\mathcal{N}^P,i}$ is considered an outlier if it is far from the centroid B and has a low p-value with respect to the other cubes in $\mathcal{N}^P$.

f) Fitting to the sorted distance vector $$\overline{d}^S$$

a polynomial (preferably a fourth-degree type), thus obtaining the vector $$\overline{d}^{SF}$$

and its first difference $$\overline{D}^{SF}.$$

g) Let m be the index of the lowest value with null slope in vector $$\overline{D}^{SF}.$$

If in the vector $$\overline{D}^{SF}$$

there is no point with null slope, m is chosen as the index of the global minimum.

h) After computing thresholds $T_1$, $T_2$, $T_3$, $T_4$, and $T_5$, forming said filtered subcellular structure set $\mathcal{N}^F$ by cubes $C_{\mathcal{N}^P,i}$ satisfying one of the following conditions $$1)\ \frac{d_i^{SF}}{d_{max}^{SF}} \leq T_1 \quad \text{(S1)}$$

$$2)\ T_1\left\langle \frac{d_i^{SF}}{d_{max}^{SF}} \leq T_2\ \& P_i^S \right\rangle T_4,$$

$$3)\ T_2\left\langle \frac{d_i^{SF}}{d_{max}^{SDF}} \leq T_3\ \& P_i^S \right\rangle T_5$$

where & is the logical and operator, $$d_i^{SF}$$

and $$p_i^S$$

are elements of vectors $$\overline{d}^{SF}$$

and $$\overline{p}^S,$$

respectively, with i=1, 2, . . . , n, and $$d_{max}^{SF}$$

is the maximum value of vector $$\overline{d}^{SF}.$$

In an embodiment, according to any one of the embodiments herein disclosed, said step viii) further comprises the following steps in order to transform the filtered subcellular structure set $\mathcal{N}^F$ into a refined subcellular structure set $\mathcal{N}^R$.

a) For each cube $C_{\mathcal{N}^F,i}$ within said filtered subcellular structure set $\mathcal{N}^F$ i. Let the augmented cube $C_{\mathcal{N}^F,i}$ be the smallest cube centered in $C_{\mathcal{N}^F,i}$ with an edge multiple of ε px, such that the p-value computed through the WMW test between its RIs and all the $\mathcal{N}^F$ values is greater than or equal to $\beta\mu(\overline{p})$, where $\mu(\bullet)$ is the average operator.

ii. To enhance the resolution, in turn dividing the augmented cube $C_{\mathcal{N}^F,i}$ into distinct sub-cubes with edges measuring $\varepsilon/2$ px.

iii. For each of these sub-cubes i. Comparing its $\varepsilon^3/8$ values with $\varepsilon^3/8$ RIs randomly drawn from the filtered nucleus set $\mathcal{N}^F$.

ii. If the computed p-value$\geq\alpha T_P$, inserting the examined sub-cube into the refined nucleus set $\mathcal{N}^R$.

b) Linking all the possible pairs of sub-cubes in the refined subcellular structure set $\mathcal{N}^R$ through a line segment.

c) Performing a morphological closing to smooth the corners of the resulting 3D polygonal and fill its holes, thus finally obtaining the partial subcellular structure set $\mathcal{N}_j$.

The parameters $\alpha$ and $\beta$ are multiplicative coefficients with values between 0 and 1. They can preferably be set to 0.9 and 0.5, respectively. Due to the fact that in various embodiments the described method exploits multiple WMW tests, in some of which the reference set is randomly drawn from a greater one, obtaining two slightly different results if this method is repeated twice on the same cell and the repetition of steps iii) to vii) K times permits to create a tomogram of occurrences as the sum of all the K partial subcellular structure sets $\mathcal{N}_j$, wherein each voxel can take integer values $k\in[0, K]$ since each voxel may have been classified as the subcellular structure k times.

An adaptive threshold k* is set to segment the tomogram of occurrences, thus obtaining the final 3D subcellular structure as the group of voxels that have been classified as the subcellular structure at least k* times.

a) Let $V_k$ be the number of voxels that have been classified nucleus at least k times, with k=1, 2, . . . , K. Therefore, $V_1$ is the number of voxels of logical or among all the K partial nucleus sets $\mathcal{N}_j$, while $V_K$ is the number of voxels of logical and among all the K partial nucleus sets $\mathcal{N}_j$.

b) Creating a vector $\overline{V}^P$ of percentage volumes, which elements are computed as $$V_k^P = \frac{V_k}{V_1}, \tag{S2}$$

with k=1, 2, . . . , K.

c) The k* threshold is found as the k index at which the percentage volume vector $\overline{V}^P$ is nearest to a threshold $T_V$.

In a further embodiment, according to any one of the embodiments herein disclosed, said resolution factor $\varepsilon$ parameter must be an even number and, after dividing each side of the 3D array by $\varepsilon$, an odd number must be obtained. A resolution factor $\varepsilon$=10 px is preferable since it is an optimum compromise between the need of having both high resolution in nucleus segmentation and high statistical power in WMW test. Anyway, in the case of tomograms with lower resolution, it can also be reduced, and all the other parameters change accordingly. However, a resolution factor $\varepsilon$ greater than 5 px is suggested in order to avoid a low statistical power in WMW test.

In another embodiment of the present invention, said K parameter is a number greater than or equal to 10. It can be preferably set to 20, since for too high values only the computational time increases, but there is no appreciable improvement in segmentation performances.

Furthermore, in an embodiment, said M parameter is a number from 5 to 15, preferably 10.

In an embodiment, said $\tau$ parameter is a number less than or equal to 0.99, preferably 0.99.

In another embodiment, said $\alpha$ parameter is a number from 0 to 1, preferably 0.9.

In another embodiment, said $\beta$ parameter is a number from 0 to 1, preferably 0.5.

In a further embodiment, in accordance to any one of the embodiments herein disclosed, said resolution factor $\varepsilon$ parameter is 10 px, said K parameter is 20, said M parameter is 10, said $\tau$ parameter is 0.99, said $\alpha$ parameter is 0.9 and said $\beta$ parameter is 0.9.

In a further embodiment of the present invention, in accordance with any one of the embodiments herein disclosed, said cyto-tomographic technique is a flow cytotomography.

In an embodiment, said subcellular structure is selected from the following ones: nucleus, mitochondria, rough endoplasmic reticulum, smooth endoplasmic reticulum, Golgi apparatus, peroxisome, lysosome, centrosome, centriole, cell membrane, cytoplasm, lipid droplets, nucleolus.

In a preferred embodiment, said subcellular structure is the nucleus, whose reference cloud for the majority of cell types is the central cube.

In an embodiment, according to any one of the embodiments herein described, the method further comprises a step of analysing a cell by a cyto-tomographic technique before step i).

In a preferred embodiment, said step of analysing a cell by a cyto-tomographic technique comprises the following steps:

a) injecting of said cell into a microfluidic channel being part of any device for tomographic flow cytometry b) recording interferometric data of said cell, preferably holographic data.

c) processing of holographic data to retrieve the 3D RI tomogram of said cell d) using any quantitative phase imaging technique capable of estimating phase contrast distributions In another embodiment, according to any one of the embodiments herein disclosed, the method further comprises a step of culturing said cells to be analysed in a culture medium before step i) and before the step of injecting of said cell into a microfluidic channel or device Said culture medium is selected from the following ones: RPMI 1640 (Sigma Aldrich), mammary epithelial cell growth medium (MEGM SingleQuots, Lonza Clonetics), Minimum Essential Medium (MEM Gibco-21090-022).

In an embodiment, said culture medium is further supplemented with fetal bovine serum in a concentration ranging from X to Y, preferably 10% by weight, L-glutamine in a concentration ranging from X to Y, preferably 2 mM, penicillin in a concentration ranging from X to Y, preferably 100 U ml$^{-1}$, streptomycin in a concentration ranging from X to Y, preferably 100 μg ml$^{-1}$.

In another embodiment of the present invention, said step c) of processing of holographic data to retrieve the 3D RI tomogram of said cell, is performed by recovering the rolling angles from the y-positions (y is the flow axis) of said cell within the imaged field of view. Let N be the number of digital holograms (i.e. frames) of said cell collected within the field of view. Let $\vartheta_1=0°$ be the rolling angle of the first frame (k=1) and let $\psi$ be a known angle rotation of said cell respect to the first frame. The rolling angles recovery method is performed through the following steps a) Computing a Phase Image Similarity Metric at the generic frame k, namely $PISM_k$, between the images' pair consisting of the QPM of the said rolling cell obtained from the first frame and the one at the frame k, for any k=2, 3, . . . , N.

b) Generating through the mathematical function {k, $PISM_k$} for k=2, 3, . . . , N a 1D pointwise curve whose global minimum corresponds to the frame of known rotation ψ of the said cell with respect to the first frame, namely $f_\psi$.

c) Computing the unknown rolling angles as follows $$\vartheta_k = \psi \frac{y_k - y_1}{y_{f\psi} - y_1}$$

where k=1, . . . , N is the frame index.

In a further embodiment, said step a) of Computing a Phase Image Similarity Metric, is performed by using the Tamura Similarity Index (TSI), based on the local contrast image calculated by the Tamura coefficient or any other numerical criterion useful for the same purpose.

TSI is a Phase Image Similarity Metric based on the local contrast measurements through the Tamura Coefficient (TC) that is the square root of the ratio between the standard deviation and the average value of a signal. In particular, let QPM(k) be the N×M quantitative phase map at the k-th frame, and let $S_{i,j}(k)$ be a 3×3 patch within QPM(k), centred in the pixel of coordinates (i,j), with i=2, . . . , N−1 and j=2, . . . , M−1. Each pixel (i,j) within QPM(k) is substituted with the TC of the $S_{i,j}(k)$ patch, thus obtaining the local contrast image (LCI), whose generic element is $$LCI_{i,j}(k) = TC\{S_{i,j}(k)\} \quad \text{(S3)}$$

with i=2, . . . , N−1, j=2, . . . , M−1 and k=1, . . . , K. Finally, the TSI is obtained as follows $$TSI = TC\{LCI(1)./LCI(k)\} \quad \text{(S4)}$$

where ./ denotes an elementwise division.

According to any one of the embodiments herein disclosed, said step b) of generating a 1D pointwise curve namely $f_\psi$, is performed by recovering the global minimum of the TSI or any other numerical criterion useful for the same purpose.

In another embodiment, said step c) of computing the unknown rolling angles is performed by defining ψ as a number such that ψ=Q×180° where Q can be in the set {1,2,3,4}, preferably Q=1.

Furthermore, in an embodiment, said TSI is calculated between pairs consisting of the QPM obtained from the first frame and all the other QPMs, flipped in the y direction if Q={1,3}.

In an embodiment, according to any one of the embodiments previously described, said step c) of computing the unknown rolling angles is performed by using any tomographic reconstruction algorithm, preferably the Learning Tomography method.

According to any one of the embodiments herein described, said identification of a subcellular structure, consisting of the full statistical characterization of the RI distribution (central moments), the full 3D morphometric analysis along with dry mass and dry mass density of the said subcellular structure.

Forms part of the present invention a computer program comprising instructions which, when the program is executed by a computer, cause the computer to carry out the method described in the present description.

Further object of the present invention is a computer-readable data carrier having stored thereon the computer program described by any one of the embodiments herein disclosed.

In an embodiment, said computer-readable data carrier is in the form of a USB pen-drive, an external hard disk (HDD), a compact disc (CD), a digital versatile disc (DVD).

Another object of the present invention is an apparatus suitable for carrying out tomographic analysis on a cell or on a group of cells, comprising a data processing device configured to execute the computer program herein described, and/or the computer-readable data carrier according to the previous embodiments.

In an embodiment, said apparatus is a flow cytometer comprising a microfluidic modulus. In a further embodiment, said apparatus comprises means of a light source to illuminate the cells flowing in the said microfluidic modulus, having the appropriate features of coherence such that an interference pattern, preferably a digital hologram, can be recorded on the digital camera, and a microscope objective to image the cells with the appropriate resolution and magnification and project said in focus or out of focus images on the sensor of the camera.

In an embodiment according to the present description, said light source can be selected among any source having appropriate coherence, preferably lasers, diode pumped solid state lasers, and Light Emitting Diodes (LEDs).

In another embodiment, said light source can be selected among any wavelength in the visible range or any other regions of the electromagnetic spectrum including X-ray regions.

Furthermore, in an embodiment of the present invention, the polarization state of said light source can be selected among any possible polarization state. The polarization is the phenomenon in which waves of light or other radiation are restricted in direction of vibration.

In an embodiment of the present invention, according to any of the embodiments herein disclosed, said apparatus is used with a single illumination source or with multiple sources having the same wavelength or multiple wavelengths.

In an additional embodiment, said apparatus is used with a single polarization state or with multiple sources having multiple polarization states.

In an embodiment of the present description, said apparatus is characterized in that the imaged Field of View of the digital hologram is such that the flowing cell experiences an enough amount of rotation angle while it travels inside the said field of view in order to retrieve a useful tomogram. Field of View of the digital hologram is the interference area imaged by the sensor of the camera.

In an embodiment, said apparatus is further characterized in that the acquisition frame rate of the camera is fast enough with respect to the longitudinal and angular cell velocity, to record the cells at different rotating positions with enough angle resolution in order to retrieve a useful tomogram of each cell.

Additionally, in an embodiment of the present invention, said apparatus has said microfluidic modulus which operates and is engineered or customized in the appropriate way in order to guarantee that the flowing cells rotate along the microfluidic channel in a way that assures the recovery of the tomogram.

In another embodiment according to the present description, said microfluidic modulus has the channel dimensions selected according to the size of the object and the flow properties in order to guarantee the rotation around a single axis.

In a further embodiment, said microfluidic modulus permits the cells to flow in a multi-channel microfluidic modulus with parallel channels, thus allowing the simultaneous recording of a large number of cells and accordingly the high-throughput property.

Furthermore, in an embodiment of the present invention according to any one of the embodiments herein disclosed, the apparatus is used in a diagnostic liquid biopsy method for the detection and classification of cells in a biological fluid sample.

In an embodiment, said biological fluid sample is selected from the following ones: blood, urine, cerebrospinal fluid, saliva, tear fluid.

In an additional embodiment, said cells analysed by the apparatus can be any type of live (cells, diatoms, microorganism, small live animals) or inanimate objects (particles, pollen grain, etc).

Advantageously, said apparatus is very useful for the research and identification of circulating tumor cells (CTC), and more generally the recognition and classification of cells in human fluids in human zootechnical and plant areas, as well as for pathology diagnostics or clinical studies and/or pharmacological tests.

In compliance with Art. 170bis of the Italian patent law it is herein declared that:

- all experiments involving cells were carried out on commercially available cells
- with reference to model mice used in the described experiments, the obligations deriving from the national or EU regulations, and in particular, from the provisions referred to in paragraph 6 of Legislative Decree No. 206 of 12 Apr. 2001 and 8 Jul. 2003 no. 224, have been fulfilled.

In any part of the present description and claims, the term comprising can be substituted by the term "consisting of".

Examples are reported below which have the purpose of better illustrating the methodologies disclosed in the present description, such examples are in no way to be considered as a limitation of the previous description and the subsequent claims.

EXAMPLES

Results

3D Learning Flow Cyto-Tomography

To reconstruct the 3D RI distribution at the single-cell level in-flow, a DH setup in microscope configuration has been used, as sketched in FIG. 2*a*. Unlike conventional ODT methods, the DH acquires multiple digital holograms of flowing and rotating cells within a microfluidic channel, exploiting the hydrodynamic forces produced by a laminar flow. Then, as summarized in FIG. 2*b*, the numerical reconstruction processing is employed to obtain the corresponding QPMs from the recorded holographic sequence. The pose of each flowing cell is calculated by the 3D holographic tracking method and the rolling angles recovery approach. Finally, a powerful ODT algorithm, namely Learning Tomography (LT), is exploited to enhance the tomographic reconstruction obtained from the initial approximation reconstructed by the inverse Radon transform. LT yields high-fidelity reconstructions by capturing high-orders of scattering which are not considered in the inverse Radon transform algorithm. The output of these operations is a stain-free 3D RI tomogram of the single-cell, with no information about the sub-cellular structuring. A system shown in FIG. 2 has been constructed and have been obtained 3D reconstructions of cells which were used for the statistical segmentation algorithm. A more detailed description of the in-flow holographic cyto-tomography setup, the numerical processing to retrieve the QPMs and their pose, and the LT algorithm is reported in the Materials and Methods section.

In order to validate the novel CSSI method, has been preliminarily tested and assessed it on a 3D numerical cell-phantom simulation. Then has been proved that experimental results were consistent with confocal fluorescence microscopy data and microfluidic cyto-fluorimeter outputs. At this aim, 3D RI tomograms of five human neuroblastoma cancer cells (SK-N-SH cell line) and three human breast cancer cells (MCF-7 cell line) have been reconstructed through the 3D learning flow cyto-tomography technique.

Assessment of the CSSI by a 3D Numerical Cell Phantom

A numerical 3D cell phantom has been modeled and simulated (see the Materials and Methods section). As reported in FIG. 3*a*, the virtual cell contains four sub-cellular structures, i.e. cell membrane, nucleus, cytoplasm, and mitochondria, simulated according to the morphological parameters measured in Wen, Y. et al. Quantitative analysis and comparison of 3D morphology between viable and apoptotic MCF-7 breast cancer cells and characterization of nuclear fragmentation. PLoS ONE 12(9), e0184726 (2017), by a confocal microscope. As shown by the RI histogram in FIG. 3*b*, a RI distribution has been assigned to each of the sub-cellular structures. Measuring accurate RI values at the sub-cellular level is still a deeply debated topic. Hence, accurate RI values cannot be replicated since they are not yet well known, therefore the unfavorable case has been simulated for the testing purpose segmenting the nucleus from cytoplasm, i.e. non-gaussian and overlapping subcellular distributions of the RI values have been modeled. Moreover, for the same reason, a RI transition zone can also be created straddling the nucleus to the cytoplasm, thus avoiding any discontinuity that could somehow facilitate the segmentation. This 3D numerical cell phantom has been used to test and assess the proposed CSSI algorithm, which starts from the location of a group of voxels belonging to the organelle to be segmented. For example, for many kinds of suspended cells, the central voxels belong to the nucleus. This property occurs especially in the case of the cancer cells.

In fact, it is confirmed by the 2D images of SK-N-SH cells recorded through a FM cyto-fluorimeter (see the Materials and Methods section), by the 3D morphological parameters reported in the literature for MCF-7 cells imaged through a confocal microscope, and more generally by the increase of the nucleus-cytoplasm ratio demonstrated in cancer cells. The CSSI method is based on the Wilcoxon-Mann-Whitney (WMW) test that is a statistical test that has been used to accept or reject the hypothesis for which a test set has been drawn from the same distribution of a designed reference set. In particular, the steps depicted in the scheme in FIG. 3*c* are performed as follows.

- Rough ε-clustering of the nucleus voxels, exploiting the WMW test to infer the statistical similarity between different voxel clouds of side ε pixels (i.e. the test sets)

and the center cloud (i.e. the initial reference set), which contains the voxels supposed belonging to the nucleus.

Filtering of the outlier nucleus voxels, because too far away from the centroid of the rough nucleus cluster in terms of both geometric and statistical distances.

Refinement of the filtered nucleus cluster to improve its external shape by adding/removing smaller voxel clouds.

Filling of the holes and smoothing of the corners of the refined nucleus cluster by common morphological operators.

Notice that, whenever the WMW test is used, the reference set is randomly selected from the last estimation of the nucleus cluster until that moment, to match its dimensionality with that of the test set, thus preserving the fairness of the statistical test. Due to this random selection, by repeating several times the described steps, at each iteration j=1, 2, . . . , K it is possible to obtain a slightly different estimation of the nucleus-like region. The output of each iteration is a binary 3D volume whose non-null values correspond to the voxels associated with the nucleus. Therefore, the sum of all the K outputs provides a tomogram of occurrences, from which the probability that a voxel belongs to the nucleus can be inferred through a normalization operation. Finally, the nucleus-like region is identified by a suitable probability threshold. A more detailed description of the CSSI algorithm is reported in the Materials and Methods section.

On the left in FIG. 3*d*, the sole simulated nucleus is reported within the outer cell shell, while on the right it is shown the nucleus segmented from the 3D numerical cell phantom through the CSSI algorithm. Let TP (True Positive) be the number of voxels that are correctly classified as nucleus, TN (True Negative) the number of voxels that are correctly classified as non-nucleus, FP (False Positive) the number of voxels that are wrongly classified as nucleus, and FN (False Negative) the number of voxels that are wrongly classified as non-nucleus. Accuracy, sensitivity, and specificity are respectively defined as $$ACC = 100\frac{T_P + T_N}{T_P + T_N + F_P + F_N};\ SENS = 100\frac{T_P}{T_P + F_N};\ SPEC = 100\frac{T_N}{T_N + F_P}. \quad (1)$$

Therefore, accuracy is the percentage of voxels correctly classified, sensitivity is the percentage of voxels correctly classified nucleus with respect to the number of nucleus voxels, and specificity is the percentage of voxels correctly classified non-nucleus with respect to the number of non-nucleus voxels. The visual comparison in FIG. 3*d* suggests that the proposed CSSI method allows segmenting a nucleus region very close to the original one, as also confirmed by the great quantitative performances reported below the tomograms. Moreover, to numerically assess the proposed 3D CSSI algorithm, it has been applied to reconstruct the nuclei of 100 numerical cell phantoms simulated by randomly drawing their morphological and RI parameters from distributions described in the Materials and Methods section and in Table S1. The overall average performances resulted to be very high, i.e. ACC=96.46%, SENS=94.77%, and SPEC=97.08%.

Discussion

Figure 1:
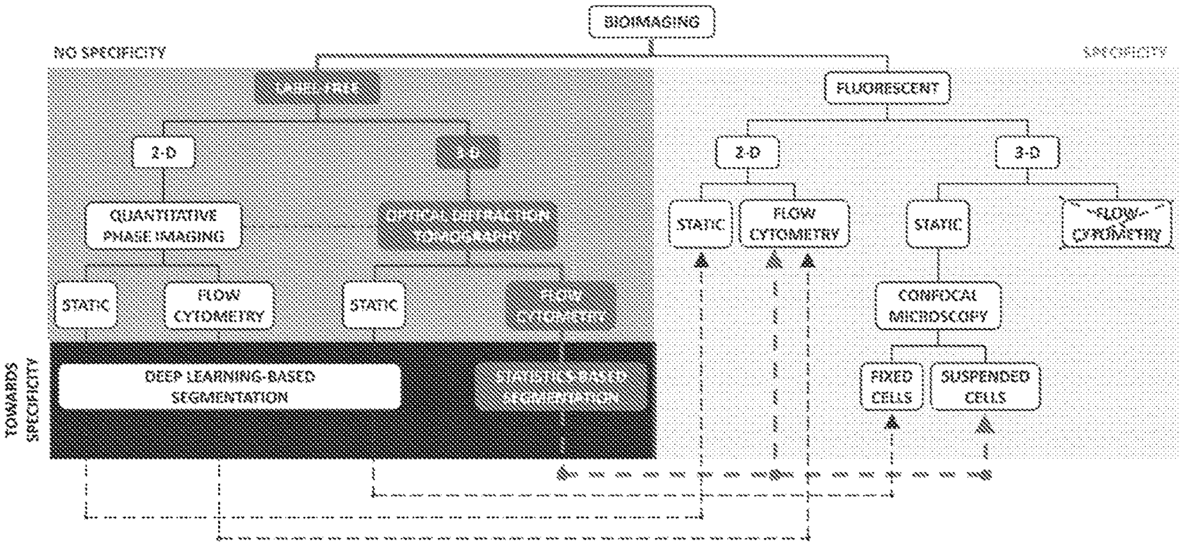
FIG. 1: Comparison between label-free and fluorescent microscopic bioimaging. Unlike the label-free bioimaging (boxes at the top left), the fluorescent bioimaging (boxes on the right) has sub-cellular specificity because nucleus is marked, but it is qualitative and limited by the staining itself.

Direct experimental validation of the proposed CSSI method is very difficult in flow-cytometry and too prone to errors that could alter the truthfulness of the experiment, as the cells should be stained and recorded simultaneously by both the holographic and the fluorescent channels. Therefore, an indirect experimental assessment of the CSSI has been performed by retrieving the stain-free nuclei for two distinct tumor cell lines starting from the 3D learning flow cyto-tomograms. In the following, it is exploited the experimental results to discuss the consistency between the Inventor's approach presented here and the classical FM microscopic methods (see the two thickest dashed lines in FIG. 1). In particular, the CSSI-based nucleus segmentation of the 3D RI tomograms is compared with the staining-based nucleus segmentation of both the 2D FM cyto-fluorimetric images and the 3D images taken at a confocal microscope.

Experimental Consistency with 2D Cyto-Fluorimetry

The proposed CSSI method has been used to retrieve the 3D nucleus-like regions from five stain-free SK-N-SH cells, reconstructed by 3D learning flow cyto-tomography. The isolevels representation of an SK-N-SH cell is shown in FIG. 4*a*, highlighting the 3D segmented nucleus-like region within the outer cell shell. Moreover, its central slice is displayed in FIG. 4*b*, in which the segmented nucleus is marked by the dark line, while in FIG. 4*c* it is reported the cell 3D RI histogram, separating the contributions of the 3D nucleus-like region and the 3D non-nucleus one.

In order to experimentally assess the validity of the 3D segmentation technique, the segmented 3D ODT reconstruction has been digitally projected back to 2D where the experimental 2D FM images are available for comparison. In particular, the segmented RI tomogram is digitally rotated from 0° to 150° with 30° angular step around x-, y- and z-axes, and then its silhouettes along the z-, x- and y-axes, respectively, are considered to create 2D ODT segmented projections, as sketched in FIG. 4*a*. According to the ray optics approximation, the phase measured with a DH is directly proportional to the integral of the RI values along the direction perpendicular to the plane of the camera. In this way, 18 unlabelled QPMs were obtained. As shown in a re-projected QPM on the left in FIG. 4*d*, it is cumbersome to recognize a sub-cellular structuring since no label is employed. However, thanks to the proposed 3D CSSI algorithm, the region occupied by the nucleus can be also marked (solid line) in the 2D ODT projection within the outer cell (dashed line). This process has been exploited to further assess the proposed segmentation algorithm, by making the 3D results obtained through the in-flow ODT technique comparable with a conventional 2D FM cyto-fluorimeter (i.e. ImageStreamX, see Materials and Methods section). The latter has been used to record 1280 2D FM images of flowing SK-N-SH single cells, in which the nuclei have been stained through fluorescent dyes. On the right in FIG. 4*d*, the bright-field image of an SK-N-SH cell has been combined with the corresponding fluorescent image of the marked nucleus, thus making the nucleus easily distinguishable (solid line) with respect to the outer cell (dashed line). ImagesStreamX can record a single random 2D image for each cell since it goes through the FOV once. Instead, ODT allows the 3D tomographic reconstruction of a single cell. Through the reprojection process, has been simulated the transition of the reconstructed cell within the ImageStreamX FOV at different 18 3D orientations with respect to the optical axis. In this way, has been digitally replicated the ImageStreamX recording process and the dataset of 2D ODT images has been increased avoiding a high correlation between the reprojections of the same cell, thanks to the chosen of a big angular step (30°). Hence, in the 3D scatter plot in FIG. 4*e*, some 2D morphological parameters representative of nucleus size, nucleus shape, and nucleus position have been quantitatively compared, i.e. nucleus-cell area ratio (NCAR), nucleus aspect ratio (NAR), and normalized nucleus-cell centroid distance (NNCCD), respectively, measured from both 90 ODT images (dark dots) and 1280 FM images (light dots). In particular, the NAR has been computed as the ratio between the minor axis and the major axis of the best-fitted ellipse to the nucleus surface, while the nucleus-cell centroid distance refers to 2D centroids and has been normalized to the radius of a circle having the same area of the cell, thus obtaining NNCCD. The 3D scatter plot highlights the great matching between ODT and FM 2D nuclear features since the ODT red dots are completely contained within the FM blue cloud. In addition, by using the WMW test between ODT and FM measurements about NCAR, NAR, and NNCCD, has been also obtained high p values, i.e. 0.980, 0.917, and 0.841, respectively, according to which it is not rejected with high confidence level the hypothesis that ODT and FM 2D nuclear features have been drawn from the same distributions. This quantitative comparison is summarized in Table 1. Moreover, to better visualize the 3D scatter plot in FIG. 4*e*, it has been split into three different 2D scatter plots, shown in FIGS. 4*f-h*. Therefore, in the 2D case of an FM cyto-fluorimeter, the proposed CSSI algorithm allows in-flow ODT to reach its same results but without using dyes to mark the nucleus and potentially preserving its fundamental high-throughput property. Furthermore, the technology of the inventors is more complete than the 2D FM cyto-fluorimeter, since it makes possible quantitative analysis of the 2D images. In fact, the ODT projections in FIG. 4*d* are much more informative than the FM ones. They contain a measurement about both the 3D sub-cellular morphology and RI distribution, coupled in the phase values of the reprojected QPMs, which can be associated to the cell biology, instead of the 2D FM images, from which the sole 2D morphological parameters can be inferred.

TABLE 1

2D morphological parameters of SK-N-SH cells measured in labelled nuclei segmented from 1820 2D FM cyto-fluorimetric images and in unlabelled nuclei segmented by CSSI algorithm from 90 2D reprojections of five in-flow ODT reconstructions.

| | | Mean Value | | p-value |
|---|---|---|---|---|
| | | ODT | FM | WMW test |
| nucleus size | nucleus-cell area ratio [a.u.] | 0.404 | 0.412 | 0.980 |
| nucleus shape | nucleus aspect ratio [a.u.] | 0.939 | 0.938 | 0.917 |
| nucleus position | normalized nucleus-cell centroid distance [a.u.] | 0.116 | 0.123 | 0.841 |

Comparison with the 3D Confocal Microscope

For the second experimental assessment, three stain-free MCF-7 cells have been reconstructed by 3D learning flow cyto-tomography and then segmented by the CSSI method, as shown in the example in FIGS. 5*a,b*. In particular, the nucleus shell is marked within the outer cell shell in the isolevels representation of FIG. 5*a*, which segmented central slice is displayed in FIG. 5*b*. Moreover, in FIG. 5*c*, it is displayed its 3D RI histogram, also separating the RI distribution of the 3D nucleus-like region and the 3D non-nucleus one.

In this case, the experimental assessment is based on a quantitative comparison with the 3D morphological parameters measured in Wen, Y. et al., in which a confocal microscope has been employed to find differences between viable and apoptotic MCF-7 cells through 3D morphological features extraction. In this study, 206 suspended cells were stained with three fluorescent dyes in order to measure average values and standard deviations of 3D morphological parameters about the overall cell and its nucleus and mitochondria. A synthetic description of 3D nucleus size, shape, and position is given by nucleus-cell volume ratio (NCVR), nucleus surface-volume ratio (NSVR), and normalized nucleus-cell centroid distance (NNCCD), respectively. In particular, in this case, the nucleus-cell centroid distance refers to 3D centroids and has been normalized with respect to the radius of a sphere having the same cell volume, thus obtaining NNCCD. Moreover, it is worth underlining that NCVR and NSVR are direct measurements reported in Wen, Y. et al., while NNCCD is an indirect measurement since it has been computed by using the direct ones in Wen, Y. et al. In the 2D scatter plots in FIGS. 5*d-f* regarding nucleus size, shape, and position, the three ODT measurements (dots) are reported along with three rectangles, which are the intervals $\mu\pm1\sigma$, $\mu\pm2\sigma$ and $\mu\pm3\sigma$, with $\mu$ the average value and $\sigma$ the standard deviation of the same parameters measured by FM confocal microscope. These scatter plots highlight a very good agreement between the 3D nucleus identified in labeled static MCF-7 cells by confocal microscope and the 3D nucleus segmented in unlabelled flowing MCF-7 cells by the proposed CSSI algorithm. In fact, all the ODT values are located in the $1\sigma$-interval around the FM average values, except for shape measurement, that is anyway located in the $2\sigma$-interval around the FM average value (FIGS. 5*d,f*). The values shown in FIGS. 5*d-f* are summarized in Table 2. Therefore, unlike confocal microscopy that can provide the sole 3D morphological features, in the technology of the inventors not only no dye is used to mark the nucleus, but also a complete quantitative 3D characterization at the sub-cellular single-cell level is possible, even RI-based, as reported in the histograms in FIG. 5*c*. In addition, the proposed CSSI algorithm, combined to the in-flow ODT method, potentially opens the route for statistical analysis at the sub-cellular level on a large number of single-cells thanks to the high-throughput property that instead is not possible through a confocal microscope. Hence, thanks to the 3D CSSI algorithm, the in-flow ODT technique can obtain simultaneously the same results of 3D confocal microscopy and 2D FM cyto-fluorimetry, but in a complete label-free, quantitative, and potentially high-throughput manner.

TABLE 2

3D morphological parameters of MCF-7 cells measured in labeled nuclei segmented from FM confocal images and in unlabelled nuclei segmented by CSSI algorithm from in-flow ODT reconstructions.

| | | FM | ODT cell 1 | ODT cell 2 | ODT cell 3 |
|---|---|---|---|---|---|
| nucleus size | nucleus-cell volume ratio [a.u.] | 0.3396 ± 0.0939 | 0.296 | 0.415 | 0.315 |
| nucleus shape | nucleus surface-volume ratio [$\mu m^{-1}$] | 0.713 ± 0.103 | 0.702 | 0.531 | 0.635 |
| nucleus position | normalized nucleus-cell centroid distance [a.u.] | 0.152 ± 0.108 | 0.053 | 0.141 | 0.172 |

Materials and Methods

Sample Preparation

MCF-7 cells were cultured in RPMI 1640 (Sigma Aldrich) supplemented with 10% fetal bovine serum, 2 mM L-glutamine and 100 U ml−1 penicillin, 100 μg ml−1 streptomycin. MCF-10A cells were cultured in mammary epithelial cell growth medium (MEGM SingleQuots, Lonza Clonetics) at 37° C. in a CO2 atmosphere. Subsequently, they were harvested from the Petri dish by incubation with a 0.05% trypsin-EDTA solution (Sigma, St. Louis, MO) for 5 min. The cells were then centrifuged for 5 min at 1500 rpm, resuspended in complete medium and injected into the microfluidic channel.

SK-N-SH cells were cultured in Minimum Essential Medium (MEM) (Gibco-21090-022) supplemented with 10% fetal bovine serum, 2 mM L-glutamine and 100 U ml−1 penicillin, 100 μg ml 1 streptomycin at 37° C. in a CO2 atmosphere. Subsequently, they were harvested from the Petri dish by incubation with a 0.05% trypsin-EDTA solution (Sigma, St. Louis, MO) for 5 min. For in flow studies after centrifugation, the cells were resuspended in complete medium and injected into the microfluidic channel at final concentration of 4×105 cells/ml.

In-Flow Cyto-Tomography Setup

The light beam generated by the laser (Laser Quantum-Torus, emitting at wavelength of 532 nm) is coupled into an optical fiber, which splits it into object and reference beams in order to constitute a Mach-Zehnder interferometer in off-axis configuration. The object beam exits from the fiber and is collimated to probe the biological sample that flows at 7 nL/s along a commercial microfluidic channel with cross section 200 μm×200 μm (Microfluidic Chip-Shop). The flux velocity is controlled by a pumping system (CETONI-neMESYS) that ensures temporal stability of the parabolic velocity profile into the microchannel. The wavefield passing throughout the sample is collected by the Microscope Objective (Zeiss 40× oil immersion—1.3 numerical aperture) and directed to the 2048×2048 CMOS camera (USB 3.0 U-eye, from IDS) by means of a Beam-Splitter that allows the interference with the reference beam. The interference patterns of the single cells rotating into a 170 μm×170 μm Field of View (FOV) are recorded at 35 fps. The microfluidic properties ensure that cells flow along the y-axis and continuously rotate around the x-axis. Each hologram of the recorded sequence is demodulated by extracting the real diffraction order through a band-pass filter, because of the off-axis configuration52. Then, a holographic tracking algorithm53 is used to estimate the 3D positions of the flowing cells along the microfluidic channel. It consists of two successive steps. The first one is the axial z-localization, in which the hologram is numerically propagated at different z-positions through the Angular Spectrum formula54, and, for each of them, the Tamura Coefficient53 (TC) is computed on the region of interest (ROI) containing the cell within the amplitude of the reconstructed complex wavefront. By minimizing this contrast-based metric, the cell z-position in each frame can be recovered, and the cell can be refocused. After computing the in-focus complex wavefront, the corresponding QPM is obtained by performing the phase unwrapping algorithm55. The second holographic tracking's step is the transversal xy-localization, which is obtained by computing the weighted centroid of the cell in its QPM53. The 3D holographic tracking allows centering each cell in all the QPM-ROIs of their recorded rolling sequence, thus avoiding motion artefacts in the successive tomographic reconstruction. Moreover, the y-positions can be exploited to estimate the unknown rolling angles46. A phase image similarity metric, namely Tamura Similarity Index (TSI), based on the evaluation of the local contrast by TC, is computed on all the QPMs of the rolling cell. It has been demonstrated minimizing in the frame f180 at which a 180° of rotation with respect to the first frame of the sequence has occurred. Thanks to the above-mentioned microfluidic properties and to the high recording frame rate, a linearization of the relationship between the angular and the translational speeds can be assumed. Hence, all the N unknown rolling angles are computed as follows $$\vartheta_k = 180^\circ \frac{y_k - y_1}{y_{f180} - y_1}$$

where k=1, . . . , N is the frame index. Finally, the tomographic reconstruction is performed by the Filtered Back Projection (FBP) algorithm.

Learning Tomography Algorithm

Learning tomography is an iterative reconstruction algorithm based on a nonlinear forward mode, beam propagation method (BPM), to capture high orders of scattering. Using the BPM, an incident light illumination has been propagated on an initial guess acquired by the inverse Radon transform and compare the resulting field with the experimentally recorded field. The error between the two fields is back-propagated to calculate the gradient. At each iteration of LT, the gradient calculation is repeated for 8 randomly selected rotation angles, and the corresponding gradients are rotated and summed to update the current solution. As an intermediate step, the total variation regularization was employed. The total iteration number is 200 with a step size of 0.00025 and a regularization parameter of 0.005.

In order to run LT, two electric fields, incident and total electric fields are needed. The amplitude of the incident field was estimated from the amplitude of the total electric field by low-pass filtering in the Fourier domain with a circular aperture whose radius is 0.176 $k_0$, where $$k_0 = \frac{2\pi}{\lambda}$$

given a wavelength λ=532 nm in a vacuum. In other words, we assume that the high-frequency information in the amplitude of the total electric field was only attributed to the light interference caused by a sample when illuminated by an illumination with slowly varying amplitude.

FM Cyto-Fluorimeter

In order to record thousands of 2D FM images, a commercial multispectral flow cyto-fluorimeter has been employed, i.e. Amnis ImageStreamX®. Cells are hydrodynamically focused within a micro-channel, and then they are probed both by a transversal brightfield light source and by orthogonal lasers. The fluorescence emissions and the light scattered and transmitted from the cells are collected by an objective lens. After passing through a spectral decomposition element, the collected light is divided into multiple beams at different angles according to their spectral bands. The separated light beams propagate up to 6 different physical locations of one of the two CCD cameras (256 rows of pixels), which operates in time operation. Therefore, the image of each single flowing cell is decomposed into 6 separate sub-images on each of the two CCD cameras, based on their spectral band, thus allowing the simultaneous acquisition of up to 12 images of the same cell, including brightfield, scatter, and multiple fluorescent images. Hence, Amnis ImageStreamX® combines the single-cell analysis of the standard FM microscopy with the statistical significance due to large number of samples provided by standard flow-cytometry.

The Amnis ImageStreamX® allows to select the magnification of Microscope Objective (MO) between 20×, 40× or 60×, and then Field of View (FoV), Pixel Size (PIX), Depth of Field (DoF), Numerical Aperture (NA) and Core Velocity (CV) change accordingly. In this experiment a 60× MO has been set, thus resulting in FoV=40 μm, PIX=0.33 μm, DoF=2.5 μm, NA=0.9 and CV=40 mm/s. With these settings, it was observed 1280 SK-N-SH cells. For each of them, two simultaneous images have been recorded, i.e. a brightfield image of the flowing cell and its corresponding FM image with the stained nucleus. To segment nucleus, a global threshold is applied to the FM signal by the associated software. Three of the recorded brightfield and fluorescent images are shown at the top and at the bottom of FIG. 8, respectively, with overlapped the contour of the segmented nucleus.

3D Numerical Cell Phantom

In Wen, Y. et al., a confocal microscope has been employed to find differences between viable and apoptotic MCF-7 cells through 3D morphological features extraction. In particular, 206 cells were stained with three fluorescent dyes in order to measure the average value and standard deviation of 3D morphological parameters about the overall cell and its nucleus and mitochondria. We exploit these measurements to simulate a 3D numerical cell phantom, by setting 1 px=0.12 μm. It is made of four sub-cellular structures, i.e. cell membrane, cytoplasm, nucleus and mitochondria. We shape cell, nucleus and mitochondria as ellipsoids, then we make irregular the cell external surface, and finally we obtain cytoplasm through a morphological erosion of the cell shape. Moreover, in each simulation, the number of mitochondria is drawn from uniform distribution $U_1\{a_1, b_1\}$. A 3D numerical cell phantom is displayed in FIG. 3*a*, in which 18 mitochondria have been simulated. To each simulated 3D sub-cellular component, we assign a RI distribution, as shown by the RI histogram in FIG. 3*b*. Measuring accurate RI values at sub-cellular level is still a deeply debated topic[33,34,50]. Therefore, we cannot replicate realistic RIs since they are not yet well known, so we simulate the worst condition for segmenting nucleus from cytoplasm, i.e. the case in which their RI distributions are very close each other. In particular, for each cell membrane voxel, we draw its RI from distribution $N_1(\mu_1, \sigma^2)$. Instead, without knowing if the nucleus RIs are greater than the cytoplasm ones or vice versa, in each simulation we randomly assign cytoplasm and nucleus to distributions $N_2(\mu_2, \sigma^2)$ or $N_3(\mu_3, \sigma^2)$. It is worth remarking that each voxel belonging to cell membrane, nucleus and cytoplasm is drawn from gaussian distributions $N_1$, $N_2$ and $N_3$ (or $N_1$, $N_3$ and $N_2$), respectively, but the cell membrane, cytoplasm and nucleus do not have a RI gaussian distribution, since, for each voxel extraction, the average values $\mu_1$, $\mu_2$ and $\mu_3$ are in turn drawn from other gaussian distributions, i.e.

$$N_{\mu_1}(\mu_{\mu_1}, \sigma_\mu^2),\ N_{\mu_2}(\mu_{\mu_2}, \sigma_\mu^2)$$

and $$N_{\mu_3}(\mu_{\mu_3}, \sigma_\mu^2),$$

respectively. Instead, as regards mitochondria, each of them has a RI gaussian distribution $N_4(\mu_4, \sigma^2)$, since the average value $\mu_4$ is drawn from the gaussian distribution $$N_{\mu_4}(\mu_{\mu_4}, \sigma_\mu^2)$$

for each mitochondrion and not for each voxel. Moreover, to make more difficult the segmentation, we create a RI transition zone straddling the nucleus to cytoplasm, thus avoiding any discontinuity. In particular, after drawing all nucleus and cytoplasm values, RIs that are in the middle of their average values are assigned to the voxels of the transition zone, as highlighted by the arrow at the top of FIG. 3*b*. This transition zone is obtained through morphological erosion and dilation of the nucleus ellipsoid, by using a spherical structuring element, which radius is drawn from the uniform distribution $U_2\{a_2, b_2\}$ px for each simulation, thus resulting in an internal nucleus volume that is about 85-95% of the total nucleus volume. In the example in FIGS. 3*a,b*, a 3 px radius has been selected. All the described parameters are reported in Table S1.

CSSI Algorithm

In order to describe the steps of the proposed CSSI algorithm, sketched in FIG. 3*c*, we exploit the 3D numerical cell phantom shown in FIGS. 3*a,b*.

1. The 3D RI tomogram of the analyzed cell is centered in its $L_x \times L_y \times L_z$ array, that is then divided into distinct cubes, each of which has an edge measuring ε pixel, as shown in the central xz-slice in FIG. 6*a*.

The ε parameter is the resolution factor at which the 3D array is firstly analyzed. It must be an even number and, after dividing each side of the 3D array by ε, an odd number must be obtained. Therefore, each distinct cube contains $\varepsilon^3$ voxels (i.e. RI values). The cubes completely contained within the cell shell are the investigated cubes $C_I$ (dark gray cubes within the black cell shell in FIG. 6*a*). The central cube is not an investigated cube, since it is taken as a reference cube $C_R$ (light gray cube in FIG. 6*a*), which vertices have x-, y- and z-coordinates taken from pairs $(V_{1x}, V_{2x})$, $(V_{1y}, V_{2y})$ and $(V_{1z}, V_{2z})$, respectively. In FIG. 6*b*, we also display the 3D array from which the central xz-slice of FIG. 6*a* has been selected.

As discussed, the CSSI algorithm is based on the WMW test. It is a rank-based non-parametric statistical test, thus distributions don't have to be normal. With a certain significance level γ, it allows accepting or rejecting the null hypothesis $H_0$ for which two sets of values have been drawn from the same distribution. An important parameter in a statistical test is the p-value, which ranges from 0 to 1. In fact, if the p-value≥γ, $H_0$ is not rejected with significance level γ, while if p-value<γ, $H_0$ is rejected with significance level γ. Therefore, a greater p-value leads more not to reject that two sets of values have been extracted from the same population. Hence, our algorithm performs multiple comparisons between the investigated cubes $C_I$ and the reference one $C_R$ through WMW test, because, as discussed above, we are assuming that $C_R$ voxels belong to the nucleus, thus if a certain $C_I$ has been drawn from its same distribution, then also the $C_I$ voxels belong to the nucleus.

2. An adaptive threshold $T_P$ is set according to the p-values computed through the WMW test between the investigated cubes $C_I$ and the reference cube $C_R$. It is chosen as the maximum value less than or equal to τ, such that for at least one $C_I$ it happens that p-value≥$T_P$.

3. A first rough clustering is performed through repeated M-iterations loops, to create a preliminary nucleus set $\mathcal{N}^P$. For each of them
   b. A temporary set $\mathcal{N}^T$ is created with the RIs of the sole reference cube $C_R$.
   c. At each of M iterations
      i. A reference set $\mathcal{R}$ is created by randomly drawing $\varepsilon^3$ values from the temporary set $\mathcal{N}^T$.
      ii. For each investigated cube $C_I$, the corresponding p-value is computed with respect to the reference set $\mathcal{R}$ through the WMW test.
      iii. The investigated cubes $C_I$ such that their p-value $\geq T_P$ are added to the temporary set $\mathcal{N}^T$.
   d. After an M-iterations loop, all the investigated cubes $C_I$ added to the temporary set $\mathcal{N}^T$ are moved to the preliminary nucleus set $\mathcal{N}^P$, and then the temporary set $\mathcal{N}^T$ is reset.
   e. Steps a-c are repeated until at least n investigated cubes $C_I$ have been stored within the preliminary nucleus set $\mathcal{N}^P$, which is shown in FIG. 6*c*.
4. A filtering operation is performed to delete outlier cubes from the preliminary nucleus set $\mathcal{N}^P$, thus creating a filtered nucleus set $\mathcal{N}^F$. Let $C_{\mathcal{N}^P,i}$ be a cube within $\mathcal{N}^P$, with i=1, 2, . . . , n.
   a. The reduced nucleus set $$N_i^{P-}$$

is created after removing the cube $C_{\mathcal{N}^P,i}$ from the preliminary nucleus set $\mathcal{N}^P$, with i=1, 2, . . . , n.

b. A p-value vector $$\overline{p}$$

of length n is created, which i-th element is the p-value computed through the WMW test between the cube $C_{\mathcal{N}^P,i}$ and the reduced nucleus set $$N_i^{P-}.$$

c. A distance vector $$\overline{d}$$

of length n is created, which i-th element is the Euclidean distance between the centre of cube $C_{\mathcal{N}^P,i}$ and point B, i.e. the centroid of the preliminary nucleus set $\mathcal{N}^P$.

d. The p-value vector $$\overline{p}$$

is sorted in ascending order, thus obtaining the sorted p-value vector $$\overline{p}^S,$$

shown in FIG. 6*d*.

e. The distance vector $$\overline{d}$$

is sorted in ascending order and normalized to its maximum, thus obtaining the sorted distance vector $$\overline{d}^S,$$

shown in FIG. 6*e* by dots.

Both vectors $$\overline{p}^S$$

and $$\overline{d}^S$$

are used to remove outlier cubes within the preliminary nucleus set $\mathcal{N}^P$. In fact, a cube $C_{\mathcal{N}^P,i}$ is considered an outlier if it is far from the centroid B and has a low p-value with respect to the other cubes in $\mathcal{N}^P$.

f. A fourth-degree polynomial is fitted to the sorted distance vector $\overline{d}^S$, thus obtaining the vector $$\overline{d}^{SF}$$

and its first difference $$\overline{D}^{SF},$$

that are reported by the solid line in FIGS. 6*e,f*, respectively.

g. Let m be the index of the lowest value with null slope in vector $$\overline{D}^{SF},$$

as highlighted by the black dot in FIG. 6*f*. If in the vector $$\overline{D}^{SF}$$

there is no point with null slope, m is chosen as the index of the global minimum.

h. After computing thresholds $T_1$, $T_2$, $T_3$, $T_4$, and $T_5$, the filtered nucleus set $\mathcal{N}^F$ reported in FIG. 6*g* is formed by cubes $C_{\mathcal{N}^P,i}$ that satisfy one of the following conditions $$1)\ \frac{d_i^{SF}}{d_{max}^{SF}} \leq T_1 \tag{S1}$$

$$2)\ T_1 \left( \frac{d_i^{SF}}{d_{max}^{SF}} \leq T_2\ \&P_i^S \right) T_4,$$

$$3)\ T_2 \left( \frac{d_i^{SF}}{d_{max}^{SDF}} \leq T_3\ \&P_i^S \right) T_5$$

where & is the logical and operator, $$d_i^{SF}$$

and $$p_{max}^{SF}$$

are elements of vectors $$\vec{d}^{SF}$$

and $$\vec{p}^s,$$

respectively, with i=1, 2, . . . , n, and $$d_{max}^{SF}$$

is the maximum value of vector $$\vec{d}^{SF}.$$

However, to build a filtered nucleus set $\mathcal{N}^F$, a strong spatial and statistical filtering has been made, in order to store only cubes that belong to the nucleus with high probability, thus leading to a strong underestimation of the nucleus region. Moreover, to increase the statistical power of the WMW test, the resolution factor ε should not be too small. As a consequence, the ε-cubic structuring element leads to a low spatial resolution.

5. A refinement step is performed, in order to transform the filtered nucleus set $\mathcal{N}^F$ into a refined nucleus set $\mathcal{N}^R$, shown in FIG. 6*h*. For each cube $C_{\mathcal{N}^F,i}$ within the filtered nucleus set $\mathcal{N}^F$,
   a. Let the augmented cube $C_{\mathcal{N}^F,i}$ be the smallest cube centered in $C_{\mathcal{N}^F,i}$ with an edge multiple of ε px, such that the p-value computed through the WMW test between its RIs and all the $\mathcal{N}^F$ values is greater than or equal to $\beta\mu(\bar{p})$, where $\mu(\bullet)$ is the average operator.
   b. To enhance the resolution, the augmented cube $C_{\mathcal{N}^F,i}$ is in turn divided into distinct sub-cubes with edges measuring ε/2 px.
   c. For each of these sub-cubes
      i. Its $\varepsilon^3/8$ values are compared with $\varepsilon^3/8$ RIs randomly drawn from the filtered nucleus set $\mathcal{N}^F$.
      ii. If the computed p-value≥$\alpha T_P$, the examined sub-cube is inserted into the refined nucleus set $\mathcal{N}^R$.
6. All the possible pairs of sub-cubes in the refined nucleus set $\mathcal{N}^R$ are linked through a line segment.
7. A morphological closing is performed to smooth the corners of the resulting 3D polygonal and fill its holes, thus finally obtaining the partial nucleus set $\mathcal{N}_j$, displayed in FIG. 6*i*.
8. Steps 1-7 are repeated K times on the same cell, thus obtaining K partial nucleus sets $\mathcal{N}_j$, with j=1, 2, . . . , K, that are slightly different from each other, because in some of the performed WMW tests, the reference set is randomly drawn from a greater one.
9. The sum of all the K partial nucleus sets $\mathcal{N}_j$ provides a tomogram of occurrences, in which each voxel can take integer values k∈[0, K] since each voxel may have been classified nucleus k times. In FIG. 7*a*, the central slice of this tomogram of occurrences is reported.
10. An adaptive threshold k* is set to segment the tomogram of occurrences. Let $V_k$ be the number of voxels that have been classified nucleus at least k times, with k=1, 2, . . . , K. Therefore, $V_1$ is the number of voxels of logical or among all the K partial nucleus sets $\mathcal{N}_j$, while $V_K$ is the number of voxels of logical and among all the K partial nucleus sets $\mathcal{N}_j$.
    a. A vector $\vec{V}^P$ of percentage volumes is created, which elements are computed as $$V_k^P = \frac{V_k}{V_1}, \tag{S2}$$

with k=1, 2, . . . , K, as reported in FIG. 7*b* by dots. The 3D segmented nucleus-like region should be computed as the set of voxels that have occurred at least $k^{opt}$ times. The parameter $k^{opt}$ should maximize simultaneously the accuracy, sensitivity, and specificity of the proposed CSSI method. In FIG. 7*c*, these performances are reported for each 3D segmented region composed by voxels that have occurred at least k times, with k=1, 2, . . . , K, along with the $k^{opt}$ value, highlighted by the vertical dark line. However, in a real experiment these trends are unknown, thus the intersection point cannot be computed. Therefore, a criterion is requested to find k* threshold, i.e. a suitable estimate of the $k^{opt}$ threshold.
    b. The k* threshold (vertical line in FIG. 7*b*) is found as the k index at which the percentage volume vector $\vec{V}^P$ is nearest to a threshold $T_V$ (horizontal line in FIG. 7*b*).

In FIG. 7*c*, where the k* threshold is highlighted by the light vertical line, it is clear that, despite $k^* \neq k^{opt}$, k* is located in the same quasi-constant region of $k^{opt}$, hence this estimated threshold leads to very little differences in terms of clustering performances with respect to the optimal one.

11. The final 3D nucleus-like region $\mathcal{N}$ is made of voxels that have been classified nucleus at least k* times, as shown in FIG. 3*d*.

In FIG. 3*d*, it is evident that the proposed CSSI algorithm allows segmenting a 3D nucleus-like region very close to the original one, as underlined by accuracy, sensitivity, and specificity reported below the tomograms. Moreover, these values are very close to the optimal ones that could be obtained by using the optimal threshold $k^{opt}$ instead of the estimated one k*, i.e. $ACC^{opt}$=98.22%, $SENS^{opt}$=98.57% and $SPEC^{opt}$=98.10%.

All the parameters involved in the proposed CSSI algorithm are described in Table S2. It is worth underlining that, in our experiments, a resolution factor ε=10 px has been set to analyse arrays made of at least 190×190×190 voxels, since it was an optimum compromise between the need of having both high resolution in nucleus segmentation and high statistical power in WMW test. Anyway, in the case of tomograms with lower resolution, it can also be reduced, and all the other parameters change accordingly. However, a resolution factor ε greater than 5 px is suggested in order to avoid a low statistical power in WMW test.

TABLE S1

Parameters used for simulating the 3D numerical cell phantoms.

| | | | | |
|---|---|---|---|---|
| $\mu_{\mu_1} = 1.352$ | $\mu_{\mu_3} = 1.368$ | $\sigma = 0.005$ | $a_1 = 10$ | $a_2 = 1$ |
| $\mu_{\mu_2} = 1.365$ | $\mu_{\mu_4} = 1.370$ | $\sigma_\mu = 0.003$ | $b_1 = 20$ | $b_2 = 3$ |

TABLE S2

Setting of the parameters involved in the CSSI algorithm to segment the stain-free 3D nucleus-like region from in-flow ODT reconstructions ($\lfloor\cdot\rfloor$, $\lceil\cdot\rceil$, and $\lfloor\cdot\rceil$ are the floor, ceil and nearest integer operators, respectively).

| | | | | |
|---|---|---|---|---|
| $\varepsilon = 10$ px | $V_{1x} = \frac{L_x - \varepsilon + 2}{2}$ | $V_{2x} = \frac{L_x + \varepsilon}{2}$ | $V_{1y} = \frac{L_y - \varepsilon + 2}{2}$ | |
| $V_{2y} = \frac{L_y + \varepsilon}{2}$ | $V_{1z} = \frac{L_z - \varepsilon + 2}{2}$ | $V_{2z} = \frac{L_z + \varepsilon}{2}$ | $\tau = 0.99$ | |
| $M = 10$ | $n = \left\lfloor \frac{2}{\varepsilon} \frac{L_x + L_y + L_z}{3} \right\rceil$ | $T_5 = 1/2\,[\mu(\bar{p}) + p_{max}]$ | $T_4 = \mu(\bar{p})$ | |
| $T_3 = \begin{cases} 0.7 & \text{if } \frac{m+1}{n} < 0.15 \\ 0.95 & \text{if } \frac{m+1}{n} > 0.85 \\ 0.7 + \frac{5}{14}\left(\frac{m+1}{n} - 0.15\right) & \text{otherwise} \end{cases}$ | | $T_V = \begin{cases} \frac{\lfloor 5\mu(\bar{V}^P) \rfloor}{5} & \text{if } \mu(\bar{V}^P) > 50\% \\ \frac{\lceil 5\mu(\bar{V}^P) \rceil}{5} & \text{if } \mu(\bar{V}^P) < 50\% \\ \mu(\bar{V}^P) & \text{if } \mu(\bar{V}^P) = 50\% \end{cases}$ | | |
| $T_2 = T_3 - 0.1$ | $T_1 = T_2 - 0.1$ | $\alpha = 0.9$ | $\beta = 0.5$ | $K = 20$ |

The invention claimed is:

1. A computer-implemented method for identifying a subcellular structure of interest of a cell analysed by flow cyto-tomography, which method comprises the following steps:

i) retrieving a 3D Refractive Index (RI) tomogram of said cell;

ii) identifying a single voxel supposed belonging to said subcellular structure of interest;

iii) defining a reference cloud of voxels ($C_R$) having as the center said single voxel in ii), wherein said reference cloud of voxels ($C_R$) means a group of adjacent voxels belonging to a cube having a side of ε pixels;

iv) calculating a statistical similarity between the reference cloud of voxels and all non-overlapped investigated clouds of voxels ($C_I$) of the same size by using a statistical similarity test, wherein said statistical similarity test can be a hypothesis test on mean value;

v) grouping the non-overlapped investigated clouds of voxels having simultaneously higher statistical similarity and spatial proximity among them and respect to the references cloud of voxels;

vi) removing statistical outlier clouds of voxels erroneously grouped in v), wherein said statistical outlier clouds of voxels are clouds of voxels that differ significantly from other non-overlapped investigated clouds of voxels grouped in v);

vii) repeating steps iii) to vi) by setting as the reference cloud of voxels a sub-group of voxels randomly selected from the grouped non-overlapped investigated clouds of voxels of vi) with a halved value of ε;

viii) repeating K times steps iii) to vii) to create K estimations of the said subcellular structure of interest;

ix) adding up all the K estimations in viii) to create a tomogram of occurrences, wherein said tomogram of occurrences is the tomogram of occurrences wherein each voxel can take integer values within [0, K], according to how many times that voxel has been included within an estimation of said subcellular structure of interest;

x) defining a threshold value for each voxel belonging to the tomogram of occurrence for which values greater than said threshold value are assigned to said subcellular structure of interest.

2. The method according to claim 1, wherein said statistical similarity test is preferably the Wilcoxon-Mann-Whitney (WMW) test or any other statistical hypothesis test, used for determining in effective way a null hypothesis $H_0$ which is that two sets of values have been drawn from the same distribution.

3. The method according to claim 2, wherein said null hypothesis $H_0$ of said WMW test can or cannot be rejected depending on the following cases, respectively:

a) $H_0$ is not rejected with the significance level γ if the p-value is greater than or equal to γ;

b) $H_0$ is rejected with the significance level γ if the p-value is lower than γ;

wherein said significance level γ is the probability to reject the null hypothesis $H_0$ when $H_0$ is true, and said p-value is the probability of obtaining test results at least as extreme as the result actually observed, under the assumption that the null hypothesis $H_0$ is correct.

4. The method according to claim 2, wherein said WMW test is carried out computing the p-value of each of said non-overlapped investigated clouds of voxels ($C_I$) with respect to said reference cloud of voxels ($C_R$), thus obtaining a variable threshold $T_P$ value according to the p-values chosen as the maximum value less than or equal to t such that for at least one $C_I$ it happens that p-value is higher or equal to $T_P$.

5. The method according to claim 4, wherein said τ is a number less than or equal to 0.99, preferably 0.99.

6. The method according to claim 1, wherein said reference cloud of voxels ($C_R$) is a cube containing $\varepsilon^3$ voxels supposed belonging to the subcellular structure of interest, chosen among the cubes obtained by centering the 3D Refractive Index Tomogram of the analyzed cell in its $L_x \times L_y \times L_z$ array and dividing it into distinct cubes, each of which has an edge measuring ε pixel.

7. The method according to claim 1, wherein said non-overlapped investigated clouds of voxels ($C_I$) are cubes completely contained within a cell's shell of the 3D Refractive Index Tomogram of the analyzed cell centered in its $L_x \times L_y \times L_z$ array, and divided into distinct cubes, each of which has an edge measuring ε pixel.

8. The method according to claim 1, wherein said grouping step v) is performed through repeated M-iterations loops, thus creating a preliminary subcellular structure set $N^P$;

wherein each M-iterations loop comprises the following steps:

a) creating a temporary set $\mathcal{N}^T$ with the RIs of the sole reference cloud of voxels $C_R$;

b) at each of M iterations:

i. creating a reference set $\mathcal{R}$ by randomly drawing 23 values from the temporary set $\mathcal{N}^T$;

ii. computing for each non-overlapped investigated cloud of voxels $C_I$, the corresponding p-value with respect to the reference set $\mathcal{R}$ through the WMW test;

iii. adding the non-overlapped investigated cloud of voxels $C_I$ such that their p-value$\geq T_P$ to the temporary set $\mathcal{N}^T$;

c) moving after an M-iterations loop, all the non-overlapped investigated cloud of voxels $C_I$ added to the temporary set $\mathcal{N}^T$ to the preliminary subcellular structure set $\mathcal{N}^P$, and then resetting the temporary set $\mathcal{N}^T$;

d) repeating steps a)-c) until at least n non-overlapped investigated cloud of voxels $C_I$ have been stored within the preliminary subcellular structure set $\mathcal{N}^P$.

9. The method according to claim 8, wherein said step vi) of removing statistical outlier clouds of voxels comprises the following steps in order to delete statistical outlier clouds of voxels from the preliminary subcellular structure set $\mathcal{N}^P$, thus creating a filtered subcellular structure set $\mathcal{N}^F$:

wherein $C\mathcal{N}^P_{,i}$ is defined to be a cube within $\mathcal{N}^P$, with i=1, 2, . . . , n;

a) creating a reduced subcellular structure set $$N_i^{P-}$$

after removing the cube $C\mathcal{N}^P_{,i}$ from the preliminary subcellular structure set $\mathcal{N}^P$, with i=1, 2, . . . , n;

b) creating a p-value vector $$\overline{p}$$

of length n, which i-th element is the p-value computed through the WMW test between the cube $C\mathcal{N}^P_{,i}$ and the reduced subcellular structure set $$N_i^{P-};$$

c) creating a distance vector $$\overline{d}$$

of length n, which i-th element is the Euclidean distance between the centre of cube $C\mathcal{N}^P_{,i}$ and point B, i.e. the centroid of the preliminary subcellular structure set $\mathcal{N}^P$;

d) sorting the p-value vector $\overline{p}$ in ascending order, thus obtaining a sorted p-value vector $$\overline{p}^s;$$

e) sorting the distance vector $$\overline{d}$$

in ascending order and normalizing said vector $$\overline{d}$$

to its maximum, thus obtaining a sorted distance vector $$\overline{d}^S;$$

f) fitting to the sorted distance vector $$\overline{d}^S$$

a polynomial (preferably a fourth-degree type), thus obtaining a vector $$\overline{d}^{SF}$$

and its first difference $$\overline{D}^{SF};$$

g) defining m to be the index of the lowest value with null slope in vector $$\bar{D}^{SF}[[.]];$$

wherein if in the vector $$\bar{D}^{SF}$$

there is no point with null slope, m is chosen as the index of the global minimum;

h) after computing thresholds $T_1$, $T_2$, $T_3$, $T_4$, and $T_5$, forming said filtered subcellular structure set $\mathcal{N}^F$ by cubes $C\mathcal{N}_{P,i}$ satisfying one of the following conditions $$1)\ \frac{d_i^{SF}}{d_{max}^{SF}} \le T_1 \quad (S1)$$

$$2)\ T_1 \left\langle \frac{d_i^{SF}}{d_{max}^{SF}} \le T_2 \,\&P_i^S \right\rangle T_4,$$

$$3)\ T_2 \left\langle \frac{d_i^{SF}}{d_{max}^{SDF}} \le T_3 \,\&P_i^S \right\rangle T_5$$

where & is the logical and operator, $$d_i^{SF}$$

and $$p_i^S$$

are elements of vectors $$\bar{d}^{SF}$$

and $$\bar{p}^S,$$

respectively, with i=1, 2, . . . , n, and $$d_{max}^{SF}$$

is the maximum value of vector $$\bar{d}^{SF}.$$

10. The method according to claim 9, wherein said step vii) further comprises the following steps in order to transform the filtered subcellular structure set $\mathcal{N}^F$ into a refined subcellular structure set $\mathcal{N}^R$;

a) for each cube $C\mathcal{N}_{F,i}$ within said filtered subcellular structure set $\mathcal{N}^F$:

i. defining $$C^A_{\mathcal{N}^F,i}$$

to be an augmented cube, wherein $$C^A_{\mathcal{N}^F,i}$$

is the smallest cube centered in $C\mathcal{N}_{F,i}$ with an edge multiple of ε px, such that the p-value computed through the WMW test between its RIs and all the $\mathcal{N}^F$ values is greater than or equal to $\beta\mu(\bar{p})$, where $\mu(\cdot)$ is the average operator;

ii. to enhance resolution, in turn dividing the augmented cube $$C^A_{\mathcal{N}^F,i}$$

into distinct sub-cubes with edges measuring ε/2 px;

iii. for each of these sub-cubes:

i. comparing its $\varepsilon^3/8$ values with $\varepsilon^3/8$ RIs randomly drawn from the filtered subcellular structure set $\mathcal{N}^F$;

ii. if the computed p-value$\ge\alpha T_P$, inserting the sub-cube into the refined subcellular structure set $\mathcal{N}^R$;

b) linking all the possible pairs of sub-cubes in the refined subcellular structure set $\mathcal{R}^R$ through a line segment;

c) performing a morphological closing to smooth the corners of the resulting 3D polygonal and fill its holes, thus finally obtaining a partial subcellular structure set $\mathcal{N}_j$.

11. The method according to claim 10, wherein said α parameter is a number from 0 to 1, preferably 0.9.

12. The method according to claim 10, wherein said β parameter is a number from 0 to 1, preferably 0.5.

13. The method according to claim 8, wherein said M parameter is a number from 5 to 15, preferably 10.

14. The method according to claim 1, wherein said step x) further comprises setting an adaptive threshold k* to segment said tomogram of occurrences, thus obtaining a final 3D subcellular structure as the group of voxels that have been classified as the subcellular structure at least k* times;

a) defining $V_k$ to be the number of voxels that have been classified subcellular structure at least k times, with k=1, 2, . . . , K; therefore, $V_1$ is the number of voxels of logical or among all K partial subcellular structure sets $\mathcal{N}_j$, while $V_K$ is the number of voxels of logical and among all the K partial subcellular structure sets $\mathcal{N}_j$;

b) creating a percentage volume vector $$\bar{V}^P$$

of percentage volumes, which elements are computed as $$V_k^P = \frac{V_k}{V_1}, \quad (S2)$$

with k=1, 2, . . . , K;

c) wherein the k* threshold is found as the k index at which the percentage volume vector $$\bar{V}^P$$

is nearest to a threshold $T_V$.

15. The method according to claim 1, wherein ε is a resolution factor and wherein ε is an even number higher than 5 px, preferably 10 px with a suitable spatial resolution, otherwise less than 10 px.

16. The method according to claim 1, wherein said K parameter is a number greater than 10, preferably 20.

17. The method according to claim 1, wherein said subcellular structure is selected from the following ones: nucleus, mitochondria, rough endoplasmic reticulum, smooth endoplasmic reticulum, Golgi apparatus, peroxisome, lysosome, centrosome, centriole, cell membrane, cytoplasm, lipid droplets, nucleolus.

18. The method according to claim 17, wherein said subcellular structure is the nucleus.

19. The method according to claim 1, further comprising a step of analysing the cell by the cyto-tomographic technique before step i).

20. The method according to claim 1, further comprising analysing the cell by a cyto-tomographic technique by performing at least the following steps:

a) injecting of said cell into a microfluidic channel being part of any device for tomographic flow cytometry;

b) recording interferometric data of said cell, preferably holographic data;

c) processing of holographic data to retrieve the 3D RI tomogram of said cell;

d) using any quantitative phase imaging technique capable of estimating phase contrast distributions.

21. The method according to claim 20, wherein said step c) is performed by:

recovering rolling angles from the y-positions (y is the flow axis) of said cell within the imaged field of view;

defining N to be the number of digital holograms (i.e. frames) of said cell collected within the field of view;

defining $\vartheta_1=0°$ to be the rolling angle of a first frame (k=1) and defining ψ to be a known angle rotation of said cell respect to the first frame;

wherein the rolling angles recovery method is performed through the following steps:

a) computing a Phase Image Similarity Metric at a generic frame k, namely $PISM_k$, between images' pair consisting of QPMs of said rolling cell obtained from the first frame and the one at the frame k, for any k=2, 3, . . . , N;

b) generating through the mathematical function {k, $PISM_k$} for k=2, 3, . . . , N a 1D pointwise curve whose global minimum corresponds to a frame of known rotation ψ of said cell with respect to the first frame, namely $f_\psi$;

c) computing the unknown rolling angles as follows $$\vartheta_k = \psi \frac{y_k - y_1}{y_{f\psi} - y_1}$$

where k=1, . . . , N is the frame index.

22. The method according to claim 21, wherein said step a) is performed by using the Tamura Similarity Index (TSI), based on a local contrast image calculated by the Tamura Coefficient (TC) or any other numerical criterion useful for the same purpose.

23. The method according to claim 22 wherein said TSI is calculated between pairs consisting of the QPM obtained from the first frame and all other QPMs, flipped in the y direction if Q={1,3}.

24. The method according to claim 21, wherein said step b) is performed by recovering a global minimum of the TSI or any other numerical criterion useful for the same purpose.

25. The method according to claim 21, wherein said step c) is performed by defining ψ as a number such that ψ=Q×180° where Q can be in the set {1,2,3,4}, preferably Q=1.

26. The method according to claim 20, wherein said step c) is performed by using any tomographic reconstruction algorithm, preferably the Learning Tomography method.

27. The method according to claim 1, wherein said identification consists in a quantification of said subcellular structure.

28. An apparatus suitable for carrying out tomographic analysis on the cell or on a group of cells, comprising a data processing device configured to execute the method of claim 1.

* * * * *